US010193661B2

(12) United States Patent
Kanayama et al.

(10) Patent No.: US 10,193,661 B2
(45) Date of Patent: Jan. 29, 2019

(54) COMMUNICATION DEVICE, NON-TRANSITORY COMPUTER READABLE MEDIUM AND WIRELESS COMMUNICATION SYSTEM

(71) Applicant: KABUSHIKI KAISHA TOSHIBA, Minato-ku (JP)

(72) Inventors: Fumiaki Kanayama, Kawasaki (JP); Yusuke Doi, Kawasaki (JP); Hiroki Kudo, Kawasaki (JP); Yuji Tohzaka, Kawasaki (JP); Ren Sakata, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/443,774

(22) Filed: Feb. 27, 2017

(65) Prior Publication Data

US 2018/0083739 A1    Mar. 22, 2018

(30) Foreign Application Priority Data

Sep. 21, 2016 (JP) .................................. 2016-184524

(51) Int. Cl.
*H04L 1/18*  (2006.01)
*H04L 1/16*  (2006.01)
*H04L 1/00*  (2006.01)

(52) U.S. Cl.
CPC .... *H04L 1/1614* (2013.01); *H04L 2001/0092* (2013.01); *H04L 2001/0097* (2013.01)

(58) Field of Classification Search
CPC ......... H04L 1/1614; H04L 1/08; H04W 84/18
See application file for complete search history.

(56) References Cited

U.S. PATENT DOCUMENTS

| 8,165,080 | B2 | 4/2012 | Jia et al. |
| 9,191,945 | B2 | 11/2015 | Seo et al. |
| 2014/0323037 | A1 | 10/2014 | Murakami et al. |
| 2016/0066319 | A1 | 3/2016 | Sakata et al. |
| 2017/0111951 | A1* | 4/2017 | Chu ............... H04W 76/025 |

FOREIGN PATENT DOCUMENTS

| JP | 2014-216796 | 11/2014 |
| JP | 5661627 | 1/2015 |
| JP | 2015-506632 | 3/2015 |
| JP | 2016-54349 | 4/2016 |

OTHER PUBLICATIONS

Takahiro Takiguchi et al., "Evaluating Power Consumption of Wireless Wake-up Communication System with Bloom Filter," Institute of Electronis, Information, and Communication Engineers, IEICE Technical Report, SIP2009-120,RCS2009-254(Jan. 2010), 2010, pp. 17(with English Abstract and Machine Generated English Tanslation).

* cited by examiner

*Primary Examiner* — Samir W Rizk
(74) *Attorney, Agent, or Firm* — Oblon, McClelland, Maier & Neustadt, L.L.P.

(57) ABSTRACT

According to one embodiment of the present invention, there is provided a communication device includes: processing circuitry configured to generate first bitmap data indicating a calculated value of a function based on identifiers of other first communication devices; and a communicator configured to transmit a first message including the first bitmap data.

11 Claims, 20 Drawing Sheets

| 1 [Byte] | 8 |
|---|---|
| DESTINATION ID 0 | ACK BLOOM FILTER |

(B)

| 1 [Byte] | 2 | 8 | N |
|---|---|---|---|
| DESTINATION ID 0 | PAYLOAD LENGTH | ACK BLOOM FILTER | PAYLOAD |

(C)

| 1 [Byte] | 1 | 2 | 8 | N |
|---|---|---|---|---|
| DESTINATION ID 0 | DESTINATION ID 1 | PAYLOAD LENGTH | ACK BLOOM FILTER | PAYLOAD |

(D)

| 1 [Byte] | 1 | 1 | 2 | 8 | N |
|---|---|---|---|---|---|
| DESTINATION ID 0 | DESTINATION ID 1 | SENDER ID | PAYLOAD LENGTH | ACK BLOOM FILTER | PAYLOAD |

INPUT, OUTPUT

| | | | |
|---|---|---|---|
| 0, 45 | 16, 22 | 32, 31 | 48, 18 |
| 1, 15 | 17, 9 | 33, 13 | 49, 50 |
| 2, 6 | 18, 44 | 34, 3 | 50, 35 |
| 3, 41 | 19, 37 | 35, 62 | 51, 46 |
| 4, 4 | 20, 23 | 36, 16 | 52, 57 |
| 5, 52 | 21, 36 | 37, 29 | 53, 51 |
| 6, 56 | 22, 47 | 38, 55 | 54, 10 |
| 7, 24 | 23, 21 | 39, 8 | 55, 7 |
| 8, 40 | 24, 27 | 40, 53 | 56, 5 |
| 9, 39 | 25, 30 | 41, 48 | 57, 11 |
| 10, 63 | 26, 32 | 42, 61 | 58, 26 |
| 11, 43 | 27, 59 | 43, 33 | 59, 17 |
| 12, 49 | 28, 14 | 44, 42 | 60, 28 |
| 13, 60 | 29, 38 | 45, 2 | 61, 12 |
| 14, 25 | 30, 20 | 46, 0 | 62, 34 |
| 15, 58 | 31, 19 | 47, 1 | 63, 54 |

| 6 | 2 | N |
|---|---|---|
| DESTINATION BLOOM FILTER | PAYLOAD LENGTH | PAYLOAD |

| ID | $H_0$ | $H_1$ | $H_2$ | $H_3$ |
|----|----|----|----|----|
| 9  | 39 | 43 | 36 | 22 |
| 81 | 41 | 34 | 43 | 9  |
| 49 | 20 | 2  | 6  | 13 |
| 78 | 22 | 38 | 53 | 6  |
| 23 | 12 | 11 | 46 | 56 |

| 1 | 1 | 2 | 8 | N×M |
|---|---|---|---|---|
| DESTINATION ID | SENDER ID | NUMBER OF PAYLOAD MESSAGES | INTERMEDIATE ROUTE BLOOM FILTER | PAYLOAD MESSAGE ARRAY |

| 1 | 1 | 1 | 1 | N×16 |
|---|---|---|---|---|
| DESTINATION ID 0 | DESTINATION ID 1 | SENDER ID | NUMBER OF PAYLOAD MESSAGES | PAYLOAD MESSAGE ARRAY |

(A)

| 8 | 2 | 2 | 4 |
|---|---|---|---|
| INTERMEDIATE ROUTE BLOOM FILTER | SENSING NODE ID | TEMPERATURE SENSOR VALUE | SENSING TIME |

(B)

```
00000 ······ 0010
10000 ······ 0000
10000 ······ 0011
11000 ······ 0100
↑↑↑↑↑              ↑
COUNTER 0
COUNTER 1
COUNTER 2
COUNTER 3
COUNTER 4          COUNTER 63
```

FIG. 28

COMMUNICATION DEVICE, NON-TRANSITORY COMPUTER READABLE MEDIUM AND WIRELESS COMMUNICATION SYSTEM

CROSS-REFERENCE TO RELATED APPLICATIONS

This application is based upon and claims the benefit of priority from Japanese Patent Application No. 2016-184524, filed, on Sep. 21, 2016; the entire contents of which are incorporated herein by reference.

FIELD

Embodiments of the present invention relate to a communication device, a non-transitory computer readable medium and a wireless communication system.

BACKGROUND

In a wireless network constructed of a plurality of nodes, wireless communication is performed so as to concentrate sensor data detected by a sensor which is mounted on each node in a concentrator. Some nodes perform power saving operation using a battery or environmental power generation (energy harvest) as a power supply. In wireless networks, intermittent communication is generally used to achieve power saving. In order to make most of limited communication resources, communication efficiency needs to be improved, and to improve communication efficiency, it is effective to use multicasting or broadcasting capable of communicating with many nodes at a time and reducing the number of communication times. In order to secure high reliability of the system in particular, it is necessary to efficiently return ACK information (positive response: ACKnowledgment) or NACK information (negative response: Negative ACKnowledgment) in response to transmission of the sensor data.

BRIEF DESCRIPTION OF THE DRAWINGS

FIG. 7 is a diagram illustrating examples of message formats according to the first embodiment;

FIG. 28 is a diagram illustrating an example of a counting filter.

DETAILED DESCRIPTION

According to one embodiment, a communication device includes: processing circuitry configured to generate first bitmap data indicating a calculated value of a function based on identifiers of other first communication devices; and a communicator configured to transmit a first message including the first bitmap data.

Hereinafter, embodiments of the present invention will be described with reference to the accompanying drawings.

First Embodiment

A wireless communication device according to a first embodiment expresses and transmits acknowledgments (responses returned when message are successfully received without errors; described hereinafter as "ACK information") to one or a plurality of nodes by putting the responses together into a Bloom filter in a wireless network, and can thereby efficiently transmit ACK information. The wireless network is, for example, of a multihop type. Hereinafter, the present embodiment will be described in detail.

Figure 1:
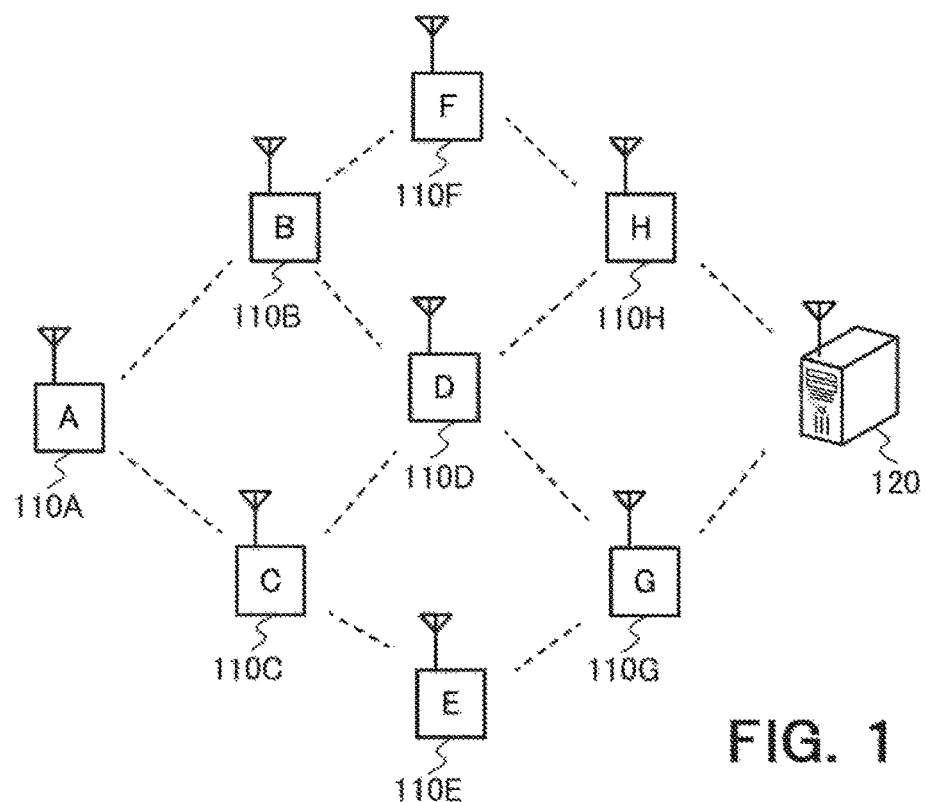
FIG. 1 is a diagram illustrating an example of a multihop wireless network according to a first embodiment.

FIG. 1 illustrates a multihop wireless network including wireless communication devices which are communication devices according to the present embodiment. The network according to the present embodiment is provided with wireless communication devices 110A to 110H configured to wirelessly transmit/receive a message and a concentrator 120 configured to wirelessly concentrate data from the wireless communication devices 110A to 110H. When the wireless communication devices 110A to 110H are not particularly distinguished from each other, the individual wireless communication devices are described as "wireless communication devices 110." The wireless communication devices 110A to 110H may also be called "nodes A to H." Dotted lines in FIG. 1 indicate that nodes can directly communicate with each other. "Carrying out direct communication" means that a message transmitted from one of two nodes is received by the other without any other node.

The wireless communication devices 110 and the concentrator 120 constitute nodes in the multihop wireless network. Through the wireless communication devices 110, data is transferred to the concentrator 120 like a bucket brigade. For example, although the node D cannot communicate with the concentrator 120, it can communicate with the node G or the node H. For this reason, if the node G or node H relays the data included in a message transmitted from the node D, the data of the node D can be delivered to the concentrator 120. Messages transmitted from the respective wireless communication devices 110 may include data generated by the wireless communication devices 110 themselves, data received from the other wireless communication devices 110 or data indicating statuses of the wireless communication devices 110 themselves. Thus, data is concentrated on the concentrator 120 by means of multihopping. Examples of the data generated by the wireless communication devices 110 themselves include data detected by sensors mounted on nodes or network data (which will be described later). The wireless communication devices 110 are more specifically devices called "end device nodes," "terminal devices," "router nodes" or "relay devices." The concentrator 120 is a device called a "coordinator," "integration device," "gateway," "server" or the like.

Figure 2:
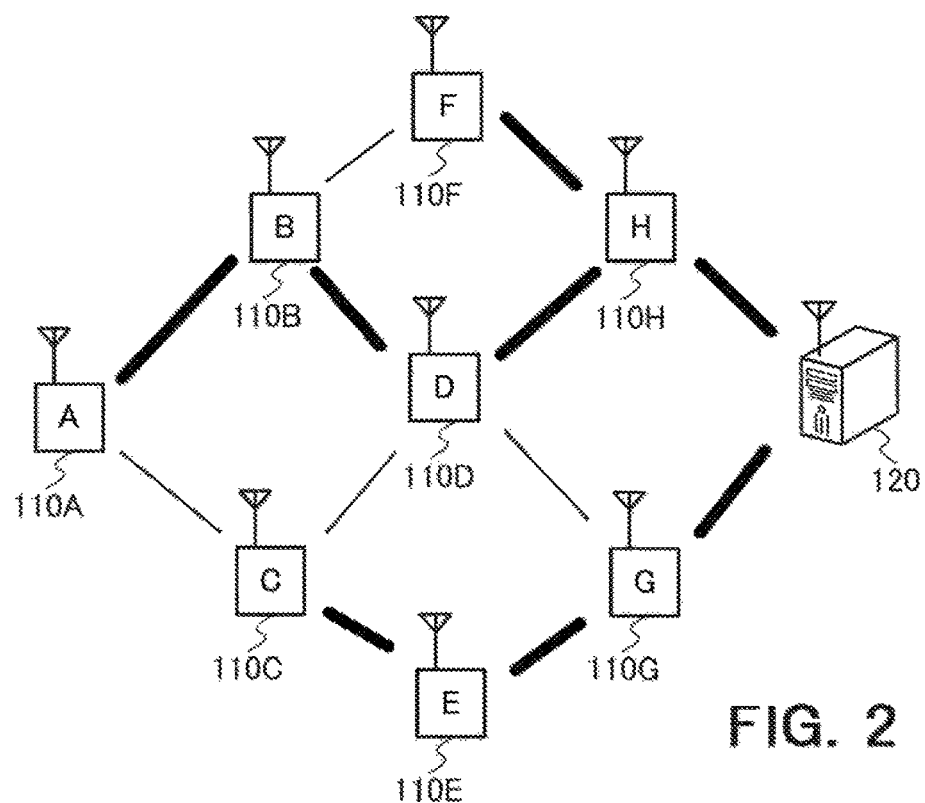
FIG. 2 is a diagram illustrating an example of transmission routes set in a multihop wireless network.

FIG. 2 illustrates an example of transmission routes (or transmission paths) set in the wireless network in FIG. 1. Thick lines connecting between nodes represent transmission routes from each node to the concentrator and thin lines represent routes that can be backups. A mode is also possible in which a certain node transmits a message to a plurality of nodes using a plurality of transmission routes simultaneously. In this case, the nodes transmit a message using links shown of thin lines in addition to links shown of thick lines.

An example of a communication scheme of the present network is TDMA (Time Division Multiple Access) scheme. In the TDMA scheme, a time frame is divided into small blocks called "slots" and each wireless communication device 110 is assigned at least one reception slot and one transmission slot in one time frame. In the reception slots, the wireless communication devices 110 can receive messages from other wireless communication devices. In the transmission slots, the wireless communication devices 110 can transmit messages to other wireless communication devices. The wireless communication device 110 may be enabled to switch between an active state and a sleep state for each slot. In the TDMA scheme, communication is carried out at predetermined timing, and therefore it is easier to guarantee punctuality of communication and a transmission delay, and the TDMA scheme may be more preferable to a CSMA/CA scheme which will be described later for a system to which these characteristics are important.

Slots are assigned by a management device or the concentrator. The assignment of slots may be determined not by the management device but by coordinated operation among nodes.

A node stores data included in messages received from other nodes until a transmission slot of the own node arrives. When a slot of the own node arrives, the node transmits a message including, for example, stored data and data generated in the own node. Each node that has received the message generates ACK information and transmits a message including the ACK information. The present embodiment transmits a Bloom filter that includes ACK information for a plurality of nodes all together and thereby efficiently perform acknowledgment response to the plurality of nodes.

In a TDMA-based network, if the number of operating frequencies is one, transmission slots which differ from one node to another are assigned. However, even when a plurality of nodes perform transmission using the same slots, if there is no possibility that radio wave interference may occur, the plurality of nodes may be assigned to one slot.

Nodes in the example of the present embodiment may receive a power supply wiredly or may receive a power supply by means of a battery, energy harvest or wireless power transmission or the like.

Ranks will be described.

A "rank" refers to a value indicating quality of a communication route from the wireless communication device 110 to the concentrator 120. As an example, the rank of the concentrator 120 is set to a minimum value (e.g., 0), and ranks of the respective nodes are set so that the lower the quality of communication with the concentrator 120, the greater the values of ranks become. For example, each node selects a node of a relay destination (hereinafter referred to as "relay node") so that the rank of the own node becomes a minimum or maximum, and can thereby transfer data to the concentrator. No matter whether the rank of the concentrator is defined as a minimum value or a maximum value, it goes without saying that the present invention is applicable.

Figure 3:
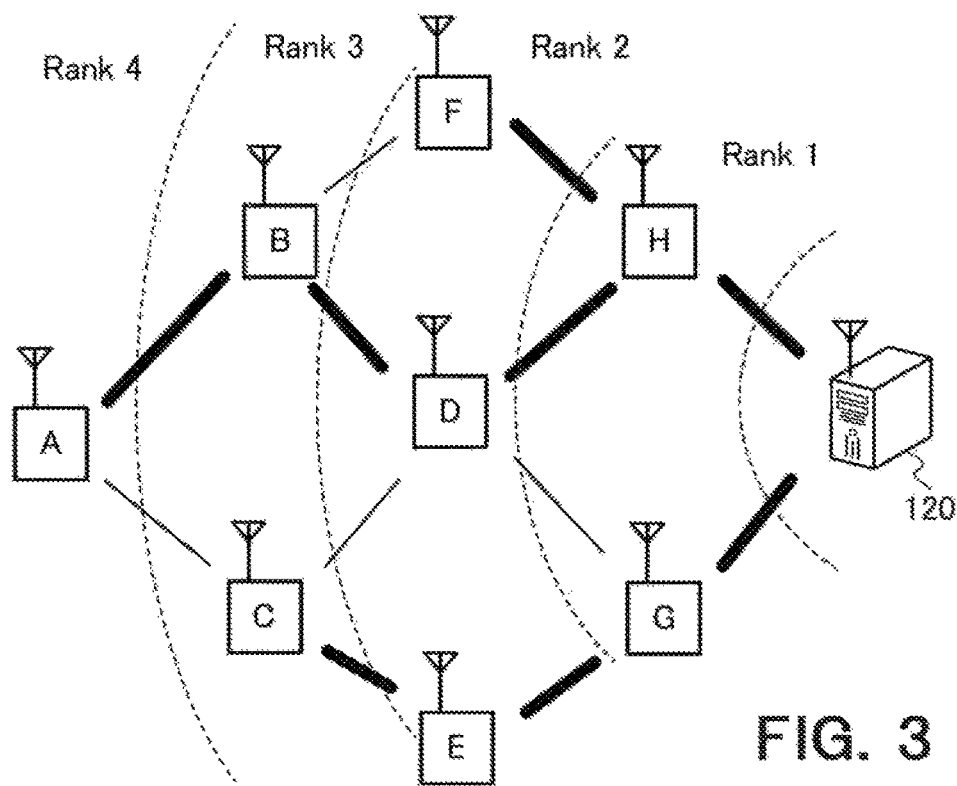
FIG. 3 is a diagram for describing ranks in accordance with the number of hops.

A first rank setting method is one that regards the number of hops up to the concentrator 120 as a rank as shown in FIG. 3.

Figure 4:
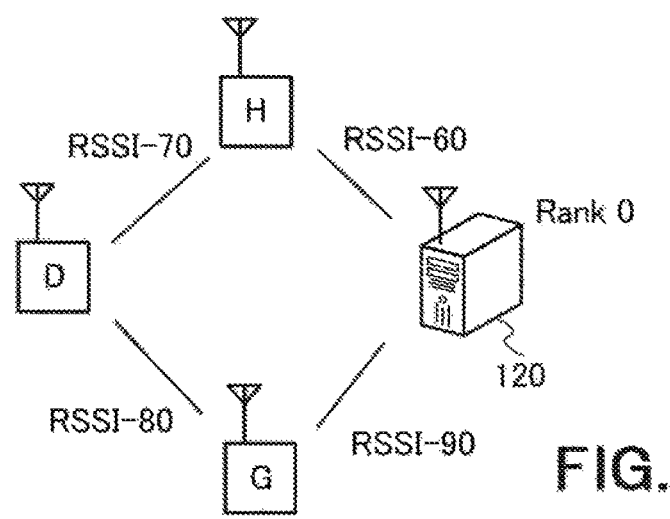
FIG. 4 is a diagram for describing a rank calculation method.

Furthermore, a second rank setting method is one that sets ranks based on "RSSI" (received signal strength; Received Signal Strength Indication or Received Signal Strength Indicator) of wireless communication between each node and the concentrator as shown in FIG. 4. Nodes that can directly communicate with the concentrator uses RSSIs in the communication with the concentrator as ranks. Nodes that cannot directly communicate with the concentrator set ranks based on the sum of absolute values of RSSIs between the nodes and a relay node, and RSSI between the relay node and the concentrator. When there are a plurality of routes from the node to the concentrator, ranks are set based on the one route.

A third rank setting method one that calculates a rank $R_i$ of a node "i" by subtracting a sum of the absolute value of RSSI between the node "i" and a node "j" and a coefficient "k" from the rank "$R_j$" of the relay node "j". This is expressed in an expression as follows.

$$R_i = R_j - \text{RSSI}_{ij} + k$$

The result of subtracting the product of a coefficient "k" and $\text{RSSI}_{ij}$ from "$R_j$" may be designated as the rank "$R_i$". For example, if k=−50, ranks of a node "H" a node "G" and a node "D" are 10, 40 and 30 respectively.

Figure 5:
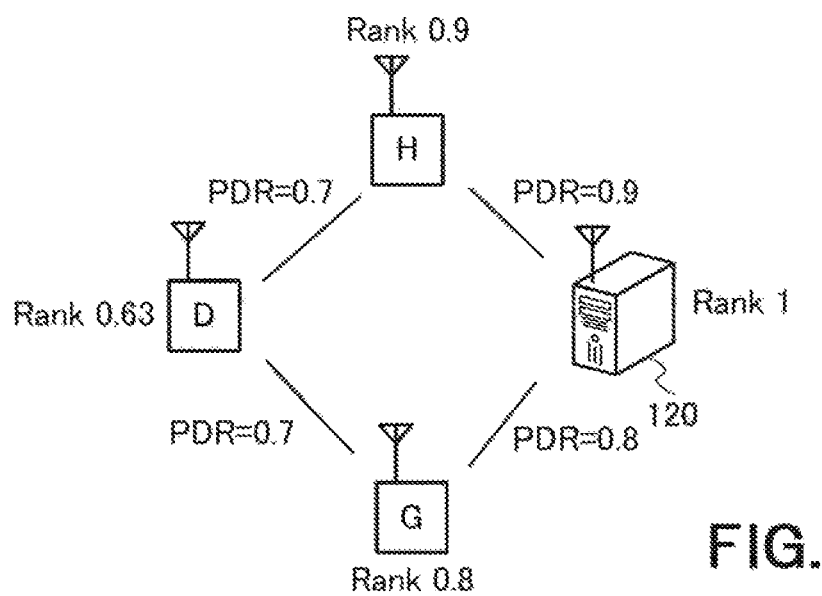
FIG. 5 is a diagram for describing another example of the rank calculation method.

A fourth rank calculation method is one that designates a transmission success rate from a transmission node to the concentrator as a rank as shown in FIG. 5. In wireless communication between two nodes, it is possible to set ranks based on an expected value (EXT, Expected Transmission Count) as to how many times the transmission node should perform transmission with the same contents so that data arrives at the reception node.

A fifth rank setting method is one that calculates ranks using a measured value of a communication success rate or an S/N ratio (SNR: Signal Noise Ratio).

Ranks may also be a combination of a plurality of values. For example, a rank may be a combination of three values: the number of hops, an error rate calculated from receiving power and an inter-node communication success rate from a system operation start time to a current time. It is also possible to designate a numerical value indicating a degree of concentration of relay data as a parameter to calculate ranks such as the number of descendant nodes which are nodes including the own node in a transfer route up to the concentrator 120.

Note that ranks may also be determined by hard coding or manual setting or may also be automatically set and updated in accordance with a variation of parameters such as an actual arrangement of nodes or wireless propagation.

Figure 6:
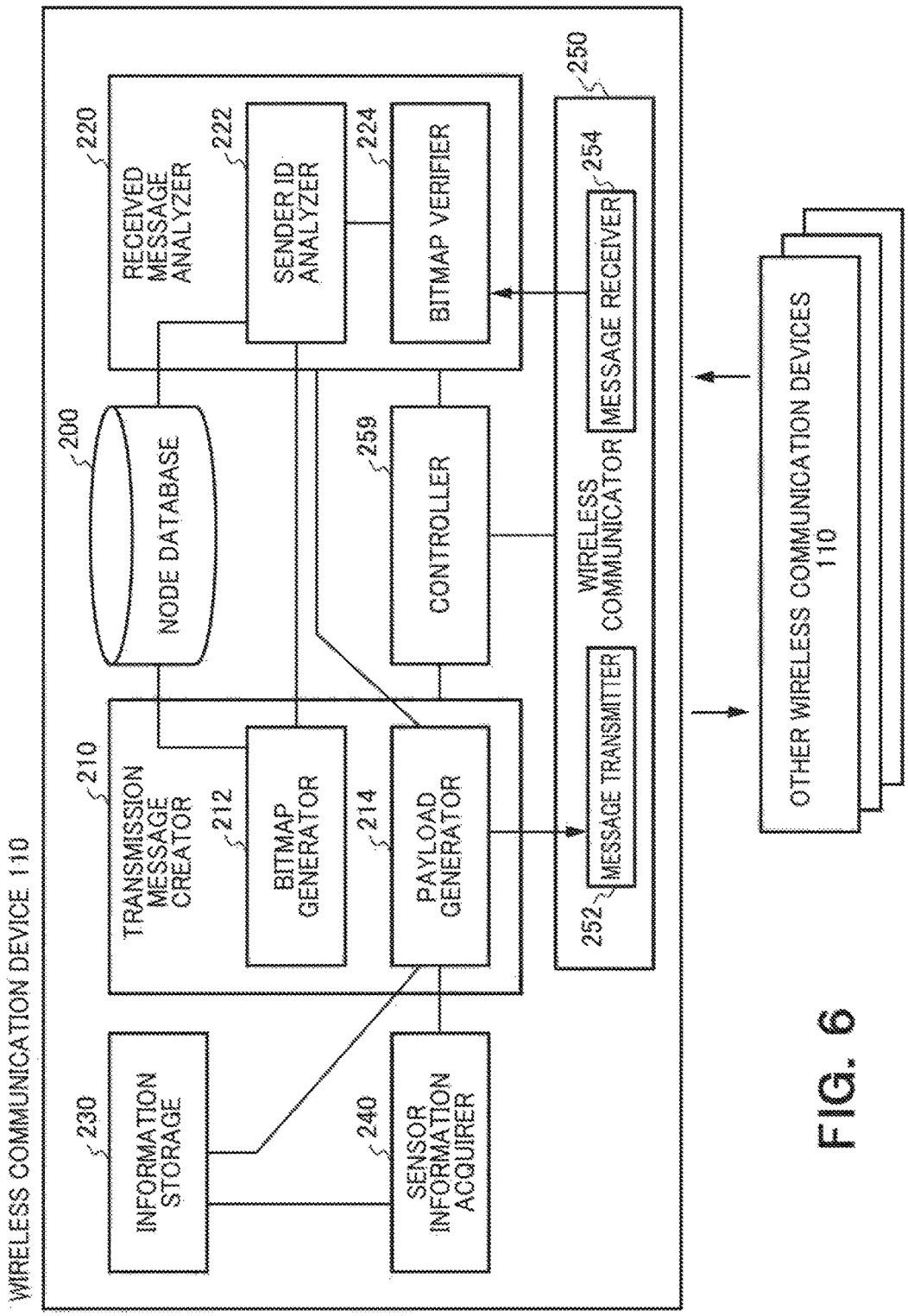
FIG. 6 is a block diagram illustrating an example of a wireless communication device according to the first embodiment.

FIG. 6 illustrates an example of a configuration of the wireless communication device 110. The wireless communication device 110 is provided with transmission message generator 210 including a bitmap generator 212. The wireless communication device 110 can further be provided with a node database 200, a received message analyzer 220, an information storage 230, a sensor information acquirer 240, a wireless communicator 250, and a controller 259. The transmission message generator may further include a payload generator 214. Each of the elements 210, 220, 240, 250 and 259 can be implemented by circuitry such as a processor or an integrated circuit. In this case, the elements 210, 220, 240, 250 and 259 may be different physical circuitry or all or a part of them may be same physical circuitry. The node database 200 and the information storage 230 can be configured by a hardware storage.

The node database 200 stores information relating to each node in the network to which the own node belongs. The node database 200 stores, for example, a node ID (Identifier) which is an identifier of each node. The node database 200 also records information on a relationship between nodes in the network, for example, a parent node and a child node of the own node. The parent node is a node communicable with the own node and is a destination of data transmitted from the own node and a node which is one rank higher in the transfer route. The child node is a node communicable with the own node, a node that transmits data to the own node as the destination and a node which is one rank lower in the transfer route. The node database 200 may store numbers or the like of slots assigned to the own node, parent node and child nodes. The node ID may be hard-coded during hardware or firmware manufacturing or when a network is started or may be dynamically determined during operation of the network as long as it is a value that can uniquely identify the node. As an example of the node ID, addresses such as MAC address or IP address may be used or a value uniquely assigned to each node participating in the network by a management device of the network (not shown) or the concentrator 120. Each node may have a plurality of IDs. The node database 200 also stores network data relating to each, node. The "network data" refers to data of information relating to various kinds of network quality such as a node status. Typical examples of the network data include ranks and RSSI between nodes, and other examples include an ID list of adjacent nodes which can directly communicate, remaining battery of each node, tendency of increase/decrease, presence/absence of energy harvest device and amount of power generation, packet error rate, accumulated number of errors or the like.

The sensor information acquirer 240 acquires sensor data using a sensor. A sensor may also be included in the sensor information acquirer 240. Examples of the sensor data include data such as temperature, humidity, acceleration, infrared (human sensor), illuminance, color, weight, amount of distortion, sound. In this case, the wireless communication device 100 may be a node dedicated to relay or a node provided with a control target such as an actuator. The wireless communication device 110 may be a node provided with both a sensor and an actuator.

The wireless communicator 250 transmits/receives a message to/from another node (another wireless communication device 110). The wireless communicator 250 is provided with a message transmitter 252 and a message receiver 254. The message transmitter 252 transmits a message generated by the transmission message generator 210 via an antenna. The message receiver 254 receives a message via the antenna and transmits the received message to the received message analyzer 220.

The transmission message generator 210 generates a transmission message using the bitmap generator 212 and the payload generator 214.

The bitmap generator 212 is configured to generate a bitmap (bit string) which is a Bloom filter indicating ACK information for a sender of a message which the message receiver 254 has successfully received for a certain period. The Bloom filter may indicate ACK information for a plurality of senders. More specifically, for example, the bitmap generator 212 generates a bitmap by setting bits corresponding to values obtained by calculating a function (hash function or the like) based on an identifier of the node which is the sender in a bitmap given in advance. For example, the bits are "1" or "0" and are assumed to be "1" in the present embodiment. The certain period is, for example, a period immediately after the previous transmission slot till immediately before the next transmission slot. The Bloom filter indicating ACK information is called an "ACK Bloom filter." A method of generating the Bloom filter and details of the hash function will be described later.

The payload generator 214 acquires data to be transmitted and generates data (payload data) to be stored in a body field (payload field) of a message using the data.

The transmission message generator 210 generates a message, in a predetermined field of which the Bloom filter generated by the bitmap generator 212 is set. For example, the payload data generated by the payload generator 214, a destination ID, a payload length or the like may also be set in the message. The format of a message may differ depending on the message transmitted.

FIG. 7(A) to FIG. 7(D) show format examples of a message according to the present embodiment.

As shown in FIG. 7(A), the message format includes an ACK Bloom filter field. The ACK Bloom filter field stores an ACK Bloom filter (bitmap). The message format may further include a destination ID 0 field. The destination ID field stores a destination ID. The message format may further include other fields.

As shown in FIG. 7(B), the message format may further include a payload length field and a payload field. The payload length field stores, for example, information indicating the length of the payload field expressed, for example, in byte units. The payload field stores data to be transmitted to the destination node.

As shown in FIG. 7(C), the message format may include a plurality of destination ID fields. The plurality of destination ID fields each store a destination node ID, and can thereby transmit data to the plurality of destination nodes.

As shown in FIG. 7(D), the message format may further include a sender ID field. The sender ID field stores an ID of the own node (node that transmits a message).

When ACK information need not be transmitted, a format without the ACK Bloom filter field in FIG. 7(B) to FIG. 7(D) may be used.

Furthermore, values other than predetermined data may be set in a specific field and the predetermined data need not be transmitted. The node on the receiving side may ignore data in the specific field.

Note that some fields of the format in FIG. 7(A) to FIG. 7(D) may be deleted or another field may be added. Furthermore, the order of fields may be optionally changed.

The formats in FIG. 7(A) to FIG. 7(D) assume a case with a message of application in the MAC layer or upper layer, for example. For example, the destination ID 0 field or destination ID 1 field may correspond to the receiver address field in the header of the MAC layer. Alternatively, the destination ID 0 field or destination ID 1 field may correspond to the destination address field in the header of the IP packet.

The received message analyzer 220 is provided with a bitmap verifier 224 and configured to perform analysis processing on the message received by the message receiver 254. The received message, analyzer 220 may further be provided with a sender ID analyzer 222.

When the message includes a sender ID field, the sender ID analyzer 222 analyzes the sender ID field and identifies the node which is the sender of the message. On the other hand, when a relationship between the transmission slot and the node is acquired, the sender ID analyzer 222 may grasp the node which is the sender from the slot number through which the message is received. Furthermore, when the node ID is included in another field such as the payload field, the node of the sender may be identified from the node ID.

The bitmap verifier 224 acquires a Bloom filter from the ACK Bloom filter field (bitmap field). The bitmap verifier 224 calculates a function (hash function or the like) based on the ID of the own node. One or a plurality of bits corresponding to the calculated value of the function in the acquired ACK Bloom filter is/are identified, and the identified bit(s) is/are verified. More specifically, for example, when the verification result is positive (e.g., when all bits match a first value (e.g., "1")), it is judged that the own node is specified, by the Bloom filter and the ACK information directed to the own node has been transmitted. This means that the parent node has successfully received the message transmitted by the own node. On the other hand, for example, when the verification result is negative (e.g., at least, one bit of the bits is a second value (=0)), it is judged that the own node is not specified and ACK information is not transmitted to the own node. This means that the parent node has not successfully received the message transmitted by the own node. Examples of cases where the reception is not successful include a case where the message itself has not reached the parent node and a case where although the message has arrived at the parent node, an error has been detected in a check of a packet.

The information storage 230 stores various kinds of information. For example, the information storage 230 stores sensor data detected by the sensor information acquirer 240. The sensor data may be managed in association with the time of detection or a slot number, or the like.

The information storage 230 stores messages received from other nodes or values of some fields (data of the payload field or the like) included in the message. The message or data may be managed in association with the number of the slot through which the message is received. Furthermore, the information storage 230 may store messages transmitted to other nodes or values of some fields included in the messages (data of payload field or the like). The messages or data may be managed in association with the number of the slot through which the message is transmitted.

The sensor information acquirer 240 may transmit sensor data to the payload generator 214.

The controller 259 controls operations the respective parts of the wireless communication device 110. For example, the controller 259 communicates with a management device, acquires a slot assigned to the own device, slot numbers assigned to the child node and the parent node or the like and manages transmission/reception of the own device. The controller 259 performs control so as to transmit a message through a transmission slot assigned to the own node. Furthermore, the controller 259 manages one or a plurality of hash functions. In the present embodiment, the hash function is stored in a buffer in the controller 259. The hash function is stored in the information storage 230, and the bitmap generator 212 may acquire the hash function from the information storage 230. The bitmap generator 212 may acquire a hash function hard-coded in firmware or dynamically generate a hash function from a network parameter or the like.

The hash function is shared among all nodes in the network and the concentrator in advance.

A computer provided with function of a wireless communication device or hardware of the same type as that of the wireless communication device 110 can be used as the concentrator 120. The concentrated data may be saved in the concentrator 120 or transferred to an upper server, cloud system or the Internet. One network may be provided with one or a plurality of concentrators 120.

Figure 8:
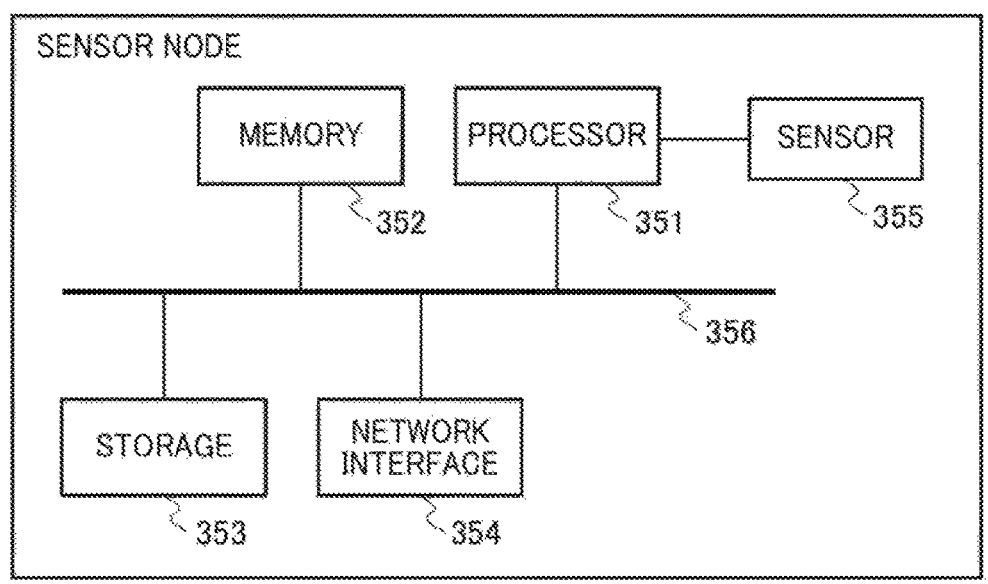
FIG. 8 is a block diagram illustrating a hardware configuration example of the wireless communication device according to the first embodiment.

FIG. 8 is a block diagram illustrating an example of a hardware configuration of a node. The wireless communication device is provided with a processor 351, a memory 352, a storage 353 and a network interface 354, and these are connected together via a bus 356. The node may further be provided with a sensor 355.

When the processor 351 reads a program from the storage 353, develops and executes the program in the memory 352, and can thereby implement the functions of the received message analyzer 220, the transmission message generator 210, the sensor information acquirer 240 and the controller 259. The processor 351 receives sensor data measured by the sensor 355. The processor 351 may control sensing timing of the sensor 355. The number of sensors 355 may be one or plural.

The memory 352 temporarily stores instructions executed by the processor 351 and various kinds of data or the like used by the processor 351. The memory 352 may be a volatile memory such as SRAM, DRAM or a non-volatile memory such as NAND, MRAM. The storage 353 is a storage device that permanently stores programs and data or the like, and is, for example, HDD or SSD. The memory 352, the storage 353 or both of them constitute buffers in the information storage 230, the node database 200, and the controller 259. The sensor data acquired by the processor 351 is stored in the memory 352, the storage 353 or both of them Messages received from other nodes or data included therein are also stored in the memory 352, the storage 353 or both of them.

The network interface 354 is an interface for carrying out wireless or wired communication and corresponds to the wireless communicator 250. The network interface 354 may also be provided with, for example, a baseband integrated circuit configured to perform header processing on a data link layer such as a MAC layer and a physical layer, modulation and demodulation or the like, an AD conversion circuit, a DA conversion circuit, and RF integrated circuit configured to perform analog processing or the like. The analog processing includes frequency conversion between a baseband and a wireless frequency, band control and amplification processing or the like. A processor such as a CPU may be disposed in the network interface 354. When TCP/IP or the like is used, the CPU on the network interface 354 may perform processing such as TCP/IP or the processor 351 connected to the bus 356 may perform such processing. Here, only one network interface is shown, but a plurality of network interfaces such as a wireless network interface and a wired network interface may be mounted. The network interface 354 is controlled by the processor 351, and messages received from other nodes or messages to be transmitted to the other nodes may be exchanged with the processor 351. Using DMA (direct memory access), the network interface 354 may directly access the memory 352.

The sensor 355 corresponds to the sensor data acquirer 240 and acquires sensor data.

The hardware configuration of the node can be modified as appropriate in accordance with the required functions of the node.

The present embodiment can simultaneously notify ACK information to a plurality of nodes through one time of message transmission using a Bloom filter. Hereinafter, a hash function and the Bloom filter will be described.

A hash function is defined as operation for obtaining, when certain data is given, a numerical value representing the data or a function to obtain such a numerical value.

Figure 9:
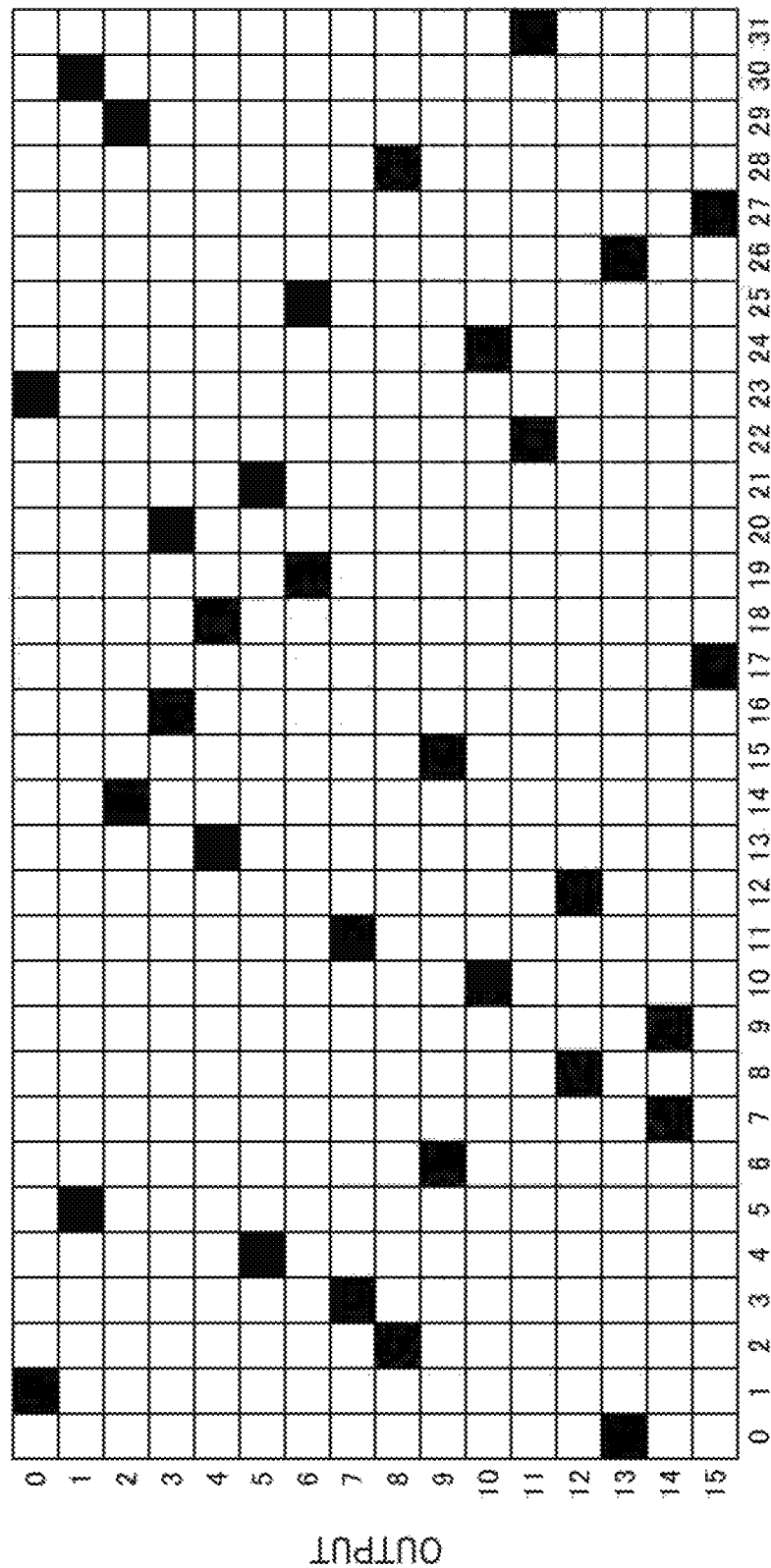
FIG. 9 is a diagram illustrating an example of input and output of a hash function.

The hash function used in the present embodiment preferably has a random output with respect to a certain input. When an argument (input value) of a hash function is the same, an output value of the hash function is also the same. As such a hash function, md5 and SHA-1 or the like are known. For example, a function of "calculating a remainder when an argument is divided by 16" where the argument is assumed to be an integer may be assumed to be a hash function with a 4-bit output. FIG. 9 schematically illustrates an example of a hash function with 5-bit input/4-bit output. This function is an example of a function of randomly mapping integer input values x of 0 to 31 to integer output values y of 0 to 15. For example, when an input is x=(0, 1, 2, 3), an output is y=(13, 1, 6, 8).

Hereinafter, the Bloom filter will be described. The Bloom filter is a filter for stochastically checking, by applying a hash function, whether or not certain given data "d" is included in a data set "X".

It is possible to verify whether or not the certain data "d" is included in the data set "X" by applying a predetermined procedure to a Bloom filter BF-X generated based on the data set "X" As a result of the procedure, two results of "positive" and "negative" are obtained.

When a negative result is obtained, there is no possibility that the data "d" may be included in the data set "X". On the other hand, when a positive result is obtained, there is a possibility that the data "d" may be included in the data set "X". A case where a positive result is obtained despite the fact that the data "d" is not included in the data set "X" is called "false positive."

Hereinafter, a method for generating a Bloom filter will be described.

The following parameters are used to generate the Bloom filter.

m: length of bit string (filter length) making, up the Bloom filter k: the number of independent hash functions used for the Bloom filter An example of the Bloom filter generating procedure is as follows.

Procedure 1: A bitmap (bit string) "F" having length "m" is provided and all bits are set to "0."

Procedure 2: "k" independent hash functions Hi( ) (where i=0 . . . k−1) whose value range is [1, m] (1 or more and "m" or less)) are provided. An argument (input parameter) of the function is entered in the parentheses.

Procedure 3: The following processing is performed on each element "xi" of the input data set "X".

(a) Set p=0

(b) End if p>k−1.

(c) Calculate idx=HP(xi) using hash function Hp( ) provided in procedure 2

(d) Set idx-th bit of bit string "F" to "1" (if "1" is already set, keep value of bit to "1" as is).

(e) Add "1" to "p".

(f) Return to (b).

Thus, the Bloom filter is generated by calculating "k" hash values "idx" from "k" hash functions for each element "xi" of the input data set "X" and setting all idx-th bits in the bit string "F" to "1" (if "1" is already set, the value of the bit is kept to "1" as is). In the present embodiment, the input data set "X" is a set of IDS of nodes to which ACK information should be transmitted and the element "xi" is an ID of an individual node.

Next, the following procedure is used to verify whether or not the data "d" is included in the input data set "X".

Procedure 1: Set "p"=0.

Procedure 2: Return "positive" if p>k−1.

Procedure 3: Calculate idx=Hp(d) for data "d" to be verified.

Procedure 4: Check idx-th bit of bit string "F" and return "negative" if it is "0."

Procedure 5: Add "1" to "p".

Procedure 6: Return to procedure 2.

When the data "d" is inputted to the "k" hash functions respectively, if all bits corresponding to the outputs "idx" of the respective hash functions are "1," "positive" is returned and if at least some bits are "0," "negative" is returned.

Here, a case where "false positive" is generated, that is, a case where the verification result becomes positive despite the fact that the data "d" is not included in the data set "X" corresponds to a case where all bits corresponding to the outputs "idx" of the respective hash functions happen to be "1." For example, suppose that there is a Bloom filter BF-Y generated from a data set "Y" composed of data "A" and data "B". When the bit positions of "1" in this Bloom filter BF-Y, that is, the bit positions of "1" based on the data "A" and the bit positions of "1" based on the data "B" are ORed, the ORed position may include the bit positions of "1" based on the data "C". In such a case, if the data d is verified using the Bloom filter BF-Y despite the fact that the data C is not included in the data set, "positive" is returned. That is, "false positive" is generated.

In the following description, a string of calculated values of a plurality of hash functions may be expressed as a hash value sequence.

In the following description, there may be a case where an expression "elements (ID or ACK information or the like)

are added to or reflected in the Bloom filter" is used. This means that a plurality of hash functions are calculated from elements (IDs or the like) and bits corresponding to the calculated values of the plurality of hash functions are set to "1." Furthermore, when an expression "the Bloom filter is generated based on a plurality of elements (IDs or the like)" is used, this means that a plurality of hash functions are calculated from the respective elements and bits corresponding to the calculated values of the plurality of hash functions are set to "1" to thereby generate the Bloom filter.

Alternatively, an expression "elements (ID or ACK information or the like) are included or not included in the Bloom filter" may be used. The former means that a plurality of hash functions are calculated from the elements and all the bits corresponding to the calculated values of the plurality of hash functions are set to "1" in the Bloom filter. The latter means that a plurality of hash functions are calculated from the elements and at least one of bits corresponding to the calculated values of the plurality of hash functions is not "1" (is "0") in the Bloom filter.

Here, a network is assumed in which a maximum number of nodes that can participate in the network is 256. A network environment is assumed in which a bit length "m" of the Bloom filter to indicate ACK information included in a message used in this network is 64 bits, that is, 8 [Bytes] and the number "n" of destination nodes which become destinations to which ACK information is returned is on the order of 7 at most.

An optimum number "k" of hash functions when "n" elements are added to an m-bit filter (bitmap) is calculated as k=(m/n)·ln 2. When m=64 and n=7 are substituted into this expression, k=6.33 results and it is most suitable to use on the order of 6 hash functions, "/" represents a division and "ln" represents a logarithm.

Figures 10, 11:
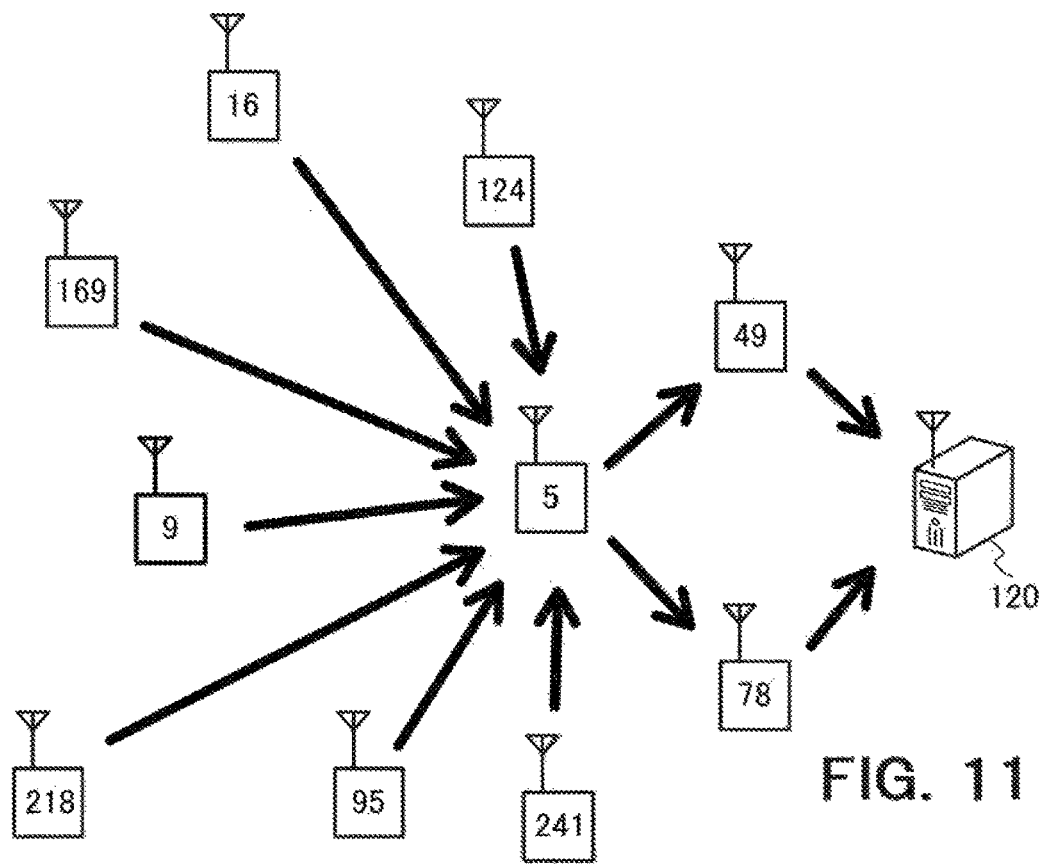
FIG. 10 is a diagram illustrating an example of input and output of a hash function different from that in FIG. 9.
FIG. 11 is a diagram illustrating an example of a network according to the first embodiment.

In the present embodiment, 6 types of hash function $H_i(x)$ are used. Suppose i=[0, 5], x=[0, 63]. For example, in the case of a node whose node ID is 9, the hash value sequence $(H_0(9), H_1(9), H_2(9), H_3(9), H_4(9), H_5(9))$ becomes (39, 43, 36, 22, 32, 55). FIG. 10 shows an example of inputs/outputs of $H_0(x)$.

FIG. 11 illustrates an example of a multihop wireless network to describe operations of nodes. Numbers assigned to the respective nodes are node IDs. In the following description, the node "X" means a node whose ID is "X". In FIG. 11, 10 nodes except the concentrator 120 exist. The concentrator 120 can communicate with a node 49 and a node 78. The nodes 49 and 78 are parent nodes of a node 5 and the node 5 is a parent node of nodes 9, 16, 95, 124, 169, 218 and 241.

Operation of the node 5 will be described. When all communications are in progress normally, the node 5 receives messages including sensor data from seven child nodes of the nodes 9, 15, 95, 124, 159, 218 and 241. The node 5 sets at least one of the nodes 49 and 78 in the destination ID field. The node 5 sets the Bloom filter (ACK Bloom filter) generated based on the IDs of the seven child nodes in the corresponding ACK Bloom filter field, generates a message, in a payload field of which data received from these child nodes is set and transmits the message. In this case, the seven child nodes are configured to receive a message directed to the parent nodes or a message received at predetermined timing (timing of slots determined in TDMA) may be regarded as a message to be received from the node 5. Thus, data transmission to the parent nodes and transmission of ACK information to the plurality of child nodes (transmission of the Bloom filter) can be performed at a time, and it is thereby possible to reduce the number of transmission times. Thus, it is possible to reduce power consumption of the node 5.

Suppose the node 5 has successfully received a message from the node 9. In this case, for example, in the next transmission opportunity (e.g., the next transmission slot of the node 5), in order to return ACK information to the node 9, six hash functions are calculated using 9 as an argument and a hash value sequence (39, 43, 36, 22, 32, 55) is obtained. The 39th, 43rd, . . . , 55th bits of the bitmap (ACK. Bloom filter) with m=64 bits in which all bits are set to "0" in advance are set to "1." Thus, the ID of the node 9 is added to the ACK Bloom filter.

When the node 5 continues to successfully receive data from the node 218, it calculates the above-described six hash functions and obtains a hash value sequence (32, 33, 27, 8, 8, 22) using "218" as an argument. With the ACK Bloom filter to which the ID of the aforementioned node 9 is added, the bit corresponding to the hash value sequence is set to "1." Thus, the ID of the node 218 is added to the ACK Bloom filter.

At this point in time, the ACK Bloom filter comes to have a bit string in which nine bits of (8, 22, 27, 32, 33, 34, 39, 43, 55) are "1" and the other bits are "0."

Suppose the node 5 has not normally received data from nodes other than the nodes 9 and 218. For example, although the node 95 has transmitted a message to the node 5, the node 5 has not successfully received the message for some reason. In this case, the node 5 does not add the ID of the node 95 to the ACK Bloom filter.

Figure 12:
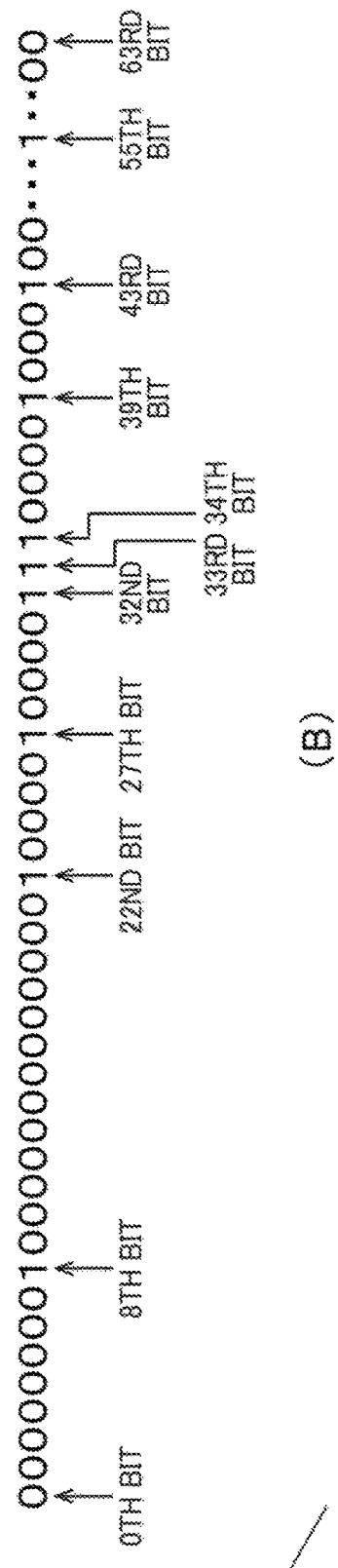
FIG. 12 is a diagram illustrating examples of hash value sequences and a Bloom filter according to the first embodiment.

FIG. 12(A) shows examples of hash value sequences of the nodes 9 and 218. FIG. 12(B) shows an example of the ACK Bloom filter to which the IDs of the nodes 9 and 218 are added. The hash value sequence has, for example, a total bit length of 64 bits. The leftmost bit is a 0th bit, and the rightmost bit is a 63rd bit. 8th, 22nd, 27th, 32nd, 33rd, 34th, 39th, 43rd and 55th bits are set to "1," and the rest of the bits are set to "0."

Since the node 5 has not successfully received data from child nodes other than the nodes 9 and 218, the node 5 will transmit a message including an ACK Bloom filter to which only the IDs of the nodes 9 and 218 are added at the next transmission opportunity.

The nodes 9, 218, 95 or the like can receive a message transmitted by the node 5. Each node verifies whether or not the own node ID is included in the ACK Bloom filter set in the ACK Bloom filter field of the message. For example, the node 9 verifies whether or not the bits corresponding to the hash value sequence (39, 43, 36, 22, 32, 55) based on the ID of the own node match "1" in the ACK Bloom filter. In this example, the bits match "1" and so the node 9 judges that the ID of the own node is included in the ACK Bloom filter and ACK information has been transmitted to the own node, and thereby recognizes that the message transmitted by the own node has been normally transmitted to the node 5. The same applies to the node 218.

On the other hand, the node 95 determines that at least one of the bits corresponding to the hash value sequence based on the ID of the own node is not "1" (is "0") and the ID of the own node is not included in the ACK Bloom filter, that is, ACK information has not been transmitted to the own node. Note that the hash value sequence of the node 95 is assumed to be (19, 5, 24, 42, 23, 45). The node 95 thereby recognizes that the message transmitted by the own node has not been correctly transmitted to the node 5. In this case, the node 95 performs predetermined processing such as retransmitting to the node 5, a message including data, transmission of which has failed.

In the above example, "32" and "22" are duplicated between the hash value sequence (39, 43, 36, 22, 32, 55) of the node 9 and the hash value sequence (32, 33, 27, 8, 8, 22) of the node 218. Furthermore, the value "8" is duplicated in the hash value sequence of the node 218. In this way, collision between hash values exists. As a result, among twelve hash values, the number of bits converted from "0" to "1" is nine. However, since not all of the six hash values generated for one ID are necessarily duplicated, the nodes 9, 218 and 95 can each correctly recognize whether or not data of the own node has been transmitted to the node 5.

Figure 13:
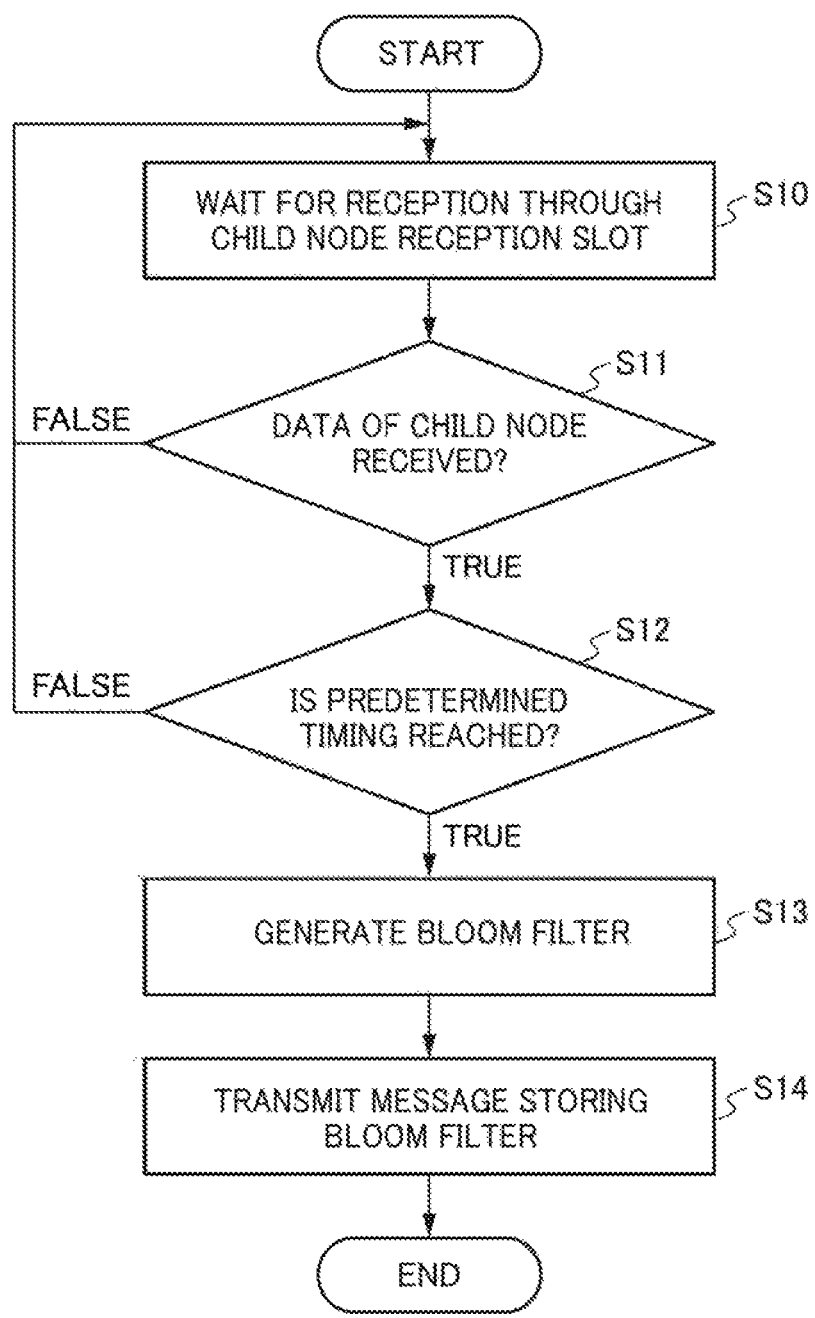
FIG. 13 is a flowchart of operation of a node according to the first embodiment.

FIG. 13 is a flowchart of operation of a parent node which receives data from one or more child nodes and returns a Bloom filter to which ACK information is added.

The parent node waits to receive a message from the child node at a reception slot from the child node (step S10). The parent node grasps in advance from which child node it is likely to receive a message through which slot. The grasping method may be communication between the parent node and the child node or the concentrator 120 or the management device may notify the message to each node. Alternatively, methods other than those described here may also be used.

When the parent node receives the message from the child node through the slot (TRUE in S11), or more specifically, when the parent node successfully receives the message without any error being detected by an error check by a protocol carrying the message, the parent node stores the message or data included therein. The storage destination may be an inner buffer provided, for example, in the controller 259, the information storage 230 or other buffers. The parent node judges whether or not predetermined timing (e.g., timing for starting transmission processing to transmit the message through the slot of the own node) is reached (S12), and when the timing is not reached (FALSE in S12), the parent node returns to S10. When the parent node has not received the message from the child node through the slot (FALSE in step S11), the parent node also returns to step S10. The case where the parent node has not received the message includes both a case where the message itself has not successfully been received and a case where an error has been detected in an error check by the protocol.

When the predetermined timing is reached (TRUE in S12), the parent node generates a Bloom filter (ACK Bloom filter) which is a bitmap based on the ID of the child node which has successfully received data (S13). The parent node transmits a message in which the ACK Bloom filter is stored in the ACK Bloom filter field (S14). Thus, it is possible to transmit ACK information to a plurality of child nodes through one message transmission.

Hereinafter, a reduction of a false detection rate of the Bloom filter (probability of the occurrence of false positive) will be described. Since the Bloom filter is generated using hash values, some of hash values may collide among a plurality of IDs. However, when the bit length "m" is sufficiently large and the number of hash functions "k" is appropriately selected for the number of elements "n" and the bit length "m", as a case of node 9 and node 218, it is highly possible to obtain correct verification results. This possibility further increases as the level of randomness of the hash function increases.

In the case of (k, m, n)=(6, 64, 7), the false detection rate (probability of the occurrence of false positive) is on the order of 1.24%, which is a sufficiently low false detection rate depending on system requirements and this is a tolerable value. When the values of "k" and "m" are fixed, the false detection rate becomes 0.00, 0.00, 0.02, 0.09, 0.27, 0.63 [%] for n=1, 2, 3, 4, 5, 6 other than n=7. Therefore, the false detection rate further decreases compared to the case where n=7 by performing network control so that many child nodes are not concentrated on one parent node, for example, through processing such as reducing the expected value of "n" is reduced to 5 or below.

Furthermore, it is also possible to reduce the false detection rate by performing certain processing. For example, using a parameter (seed value) indicating an instruction or notification or the like for the communication destination in addition to the ID as an argument of the hash function, it is possible to reduce the probability that the hash values will match. For example, a calculated value (addition value of ID and parameter) based on the ID and parameter (seed value) is used as an argument. A time-dependent element may also be used as the parameter. Examples of the time-dependent element include a slot, a time frame or a sequence number which is incremented every time a super-frame composed of a plurality of time frames advances, a sequence number which is updated every time a message is transmitted, time information. Use of such elements causes the argument of a hash function to fluctuate for every calculation, and it is thereby possible to suppress the probability of collision between hash values among a plurality of nodes or at the same node. Another method of reducing the false detection rate may be to differentiate hash functions used according to the sequential number. When information not shared among a plurality of nodes (e.g., current time) is used, the information may be included in a message to notify the information to the destination node.

Note that when the value of "m" is extremely small, for example, 4, the possibility that two hash values may collide increases and a false detection occurs at a probability of 25% under a condition of n=2 and k=1. As an example, a situation is assumed in which a hash value (3 bits) of the node 9 is "1", a hash value (3 bits) of the node 169 is also "1," the node 9 succeeds in data transmission to the node 5 and the node 169 fails in data transmission to the node 5. In this case, since the first bit of the ACK Bloom filter received from the node 5 is "1," the node 169 falsely recognizes that data transmission by the own node has been successful. In this case, data which would originally need to be retransmitted is misjudged as being unnecessary to be retransmitted, causing the data to be omitted from the network. Therefore, it is desirable to reduce the false detection rate by appropriately selecting "m," "n" and "k" and using time-dependent elements.

As described above, according to the present embodiment, it is possible to efficiently notify ACK information by adding to the ACK Bloom filter, IDs of one or a plurality of child nodes to which ACK information is to be transmitted by transmitting a message including the ACK Bloom filter. Furthermore, the ACK Bloom filter may be included in the message data-transmitted to the parent node, and in this case, data transmission to the parent node and transmission of ACK information can be performed simultaneously by one message transmission, and a greater amount of information can be transmitted efficiently. Thus, power involved in transmission/reception of a message can be reduced and highly reliable transmission can be ensured.

Note that an expected value or maximum value of the number of child nodes (the number of elements) "n", an optimum value of the number of hash functions "k" vary from one application target to another of the wireless sensor network, and furthermore, may change over time. Thus, it is necessary to select an appropriate value of "k" to minimize the false detection rate. Therefore, an appropriate value of "k" may be selected at a certain or optional time interval to update "k." For example, it is possible to mount a mechanism for updating the value of "k" in a transmission cycle of several times to several tens of times or a mechanism for redistributing an updated value of "k" when an optimum value of "k" drastically changes and flexibly adapt to a dynamic variation in the state of the network while keeping information efficiency of the Bloom filter optimum. Note that even when "k" is not set optimally, as long as it is not excessively deviated from an optimum value, the false detection rate will not drastically deteriorate. For this reason, even if the value of "k" is updated at timing as shown in this example, there is no problem. The format of a message to notify the value of "k" may be defined aside from the aforementioned message formats (see FIG. 7(A) to FIG. 7(D)). Adding the field in which the value of "k" is set to the formats in FIG. 7(A) to FIG. 7(D) will lead to an increase of the byte length for transmitting ACK information, and is often inefficient from the standpoint of an information density. Thus, if the transmission frequency is sufficiently lower than that of ACK information, it is efficient to transmit the value of "k" using a format different from this. In this way, causing the value of "k" to change according to the state of the network as appropriate can also be enumerated as an application example of the present embodiment. In each node, a plurality of hash functions to be used are defined in association according to the value of "k" and the plurality of hash functions used can be identified according to the notified value of "k."

It is also possible to generate a Bloom filter in which more diversified types of information is embedded using many types of hash functions. As an example, it is possible to provide ACK information with a variation. The above-described ACK information is simply information indicating success or failure of data transmission, whereas two types of ACK information: ACK-A and ACK-B are defined here.

ACK-A indicates that although data has been successfully, normally received (without any reception error) through wireless communication, the data has not been successfully, correctly stored in the buffer due to buffer overflow of the data or other internal errors. ACK-B indicates that data has been successfully, normally received and the data has also been successfully, correctly stored in the buffer. The node which has successfully received the data selects either ACK-A or ACK-B and maps the selected ACK information to the Bloom filter. The node which has received the Bloom filter has no problem with wireless quality of the link because wireless communication itself is successful when the Bloom filter includes ACK-A, whereas it can be judged that the data needs to be retransmitted. When neither ACK-A nor ACK-B is successfully received, it can be judged that the data, of course, needs to be retransmitted and wireless link quality may have degraded. For this reason, the fact that neither ACK-A nor ACK-B has been successfully received can be used as a material to judge the network reconfiguration (change of the parent node or change of the transmission route).

As the method of mapping the selected ACK information to the Bloom filter, hash functions for ACK-A and hash functions for ACK-B which is different from ACK-A may be provided respectively. As another method, when ACK-A is expressed, a numerical value obtained by adding an optional integer value, for example, 1000 to the ID is used as an argument of the hash functions, and when ACK-B is expressed, the ID may be used as an argument of the hash functions as is. Thus, it is possible to express ACK-A and ACK-B using the same hash function. However, in this case, when the numerical value to be added is a small value such as "1," ACK-A of the node 9 and ACK-B of the node 10 become the same argument, with the result that the same hash value is generated. For this reason, the addition value needs to be determined so that the arguments of the hash function do not match.

Note that when ACK information is transmitted without distinguishing ACK-A from ACK-B, it is possible to optionally determine as to how ACK information should be interpreted. For example, the ACK information may be interpreted as ACK associated with the physical layer of wireless communication or a data link layer or the ACK information may be interpreted as ACK associated with the network layer to the application layer as ACK-B. In the present embodiment, either mode is possible.

In the present embodiment, in order to reduce collision of hash values, it is possible to judge by calculations in what combination of nodes collision of hash values occurs in advance or during operation of the system, and thereby determine, using this judgment result, hash functions and parameters of arguments so as to suppress collision of hash values. It is possible to suppress collision of hash values by sharing the determined information among the nodes carrying out communication and in the entire network.

For example, in the network shown in FIG. 2, suppose there are hash function groups "X" and "Y", and hash function groups to be used in each node can be selected from "X" or "Y". Suppose that the concentrator 120 verifies hash collision and it is known that when the hash function group "X" is used, the hash values of the node "F" and the node "D" collide, whereas when the hash function group "Y" is used, no collision occurs. In this case, the concentrator 120 notifies the use of the hash function "Y" for at least node communication among the nodes "D", "F" and "H", and no collision of hash values occurs among the three nodes.

Furthermore, suppose that another hash function group "Z" exists and using it, hash values of the nodes "E" and "F" collide with each other. In this case, if the concentrator 120 grasps that there is no node that communicates with both nodes "E" and "F", it is possible to determine use of the hash function group "Z". It is actually difficult to guide hash function groups so as to prevent collision of hash values over the entire network while suppressing the bit length "m" to a small value, and so it may be possible to induce hash function groups so as to avoid collision of hash values at local levels as described, above while accepting collision at levels of the entire network.

Note that examples of the method of judging that hash values of the nodes "E" and "F" do not collide with each other include a method for a network administrator to manually input the judgment, a method of guessing the judgment from a physical layout of nodes, a method of guessing the judgment from a system operation history until a judgment is made. However, the method may be any of these methods or other methods. Furthermore, calculations for verifying collision of hash values may be carried out by the concentrator 120 or another computer that can communicate with the concentrator 120, each wireless communication device, or a computer not in a relation that allows it to communicate with the concentrator, or may be carried out by manual calculations.

Second Embodiment

In the first embodiment, ACK information for one or a plurality of nodes is expressed by a Bloom filter, whereas in the present embodiment, a negative response (NACK information) for one or a plurality of nodes is expressed by a Bloom filter. The NACK information is a response to be returned when data has not been actually received in a situation in which the data is expected to enabled to be received. It is determined by the system in advance whether a scheme of returning ACK information (ACK scheme) is adopted when data has been normally received or a scheme of returning NACK information (NACK scheme) is adopted when data has not been successfully, normally received. The present embodiment assumes a system using the NACK scheme. Hereinafter, description will be given focusing on differences from the aforementioned embodiment and redundant description will be omitted.

FIG. 14(A) to FIG. 14(D) show examples of message formats according to the present embodiment. The message format in FIG. 14(A) is provided with a NACK Bloom filter field which is a bitmap address field. The message format may further include a destination ID "0" field. The NACK Bloom filter field is a field that stores a NACK Bloom filter which notifies a negative response of data reception. The NACK Bloom filter field is an example of a first field that stores a bitmap according to the present embodiment. The formats in FIG. 14(B) to FIG. 14(D) are also the same as those in FIG. 7(B) to FIG. 7(D) except that the ACK Bloom filter field is substituted by the NACK Bloom filter field. When the NACK information need not be transmitted, the formats in FIG. 14(B) to FIG. 14(D) from which the NACK Bloom filter field is omitted may be used.

When the NACK scheme is used, each node first needs to acquire information on from which node it should receive data. For this reason, the controller 259 of the node executes a procedure for establishing a connection state between nodes in advance or exchanges messages corresponding thereto and creates and stores a list of partner nodes (child nodes).

The received message analyzer 220 of the node identifies all IDs of child nodes which have failed to receive the messages out of the child nodes registered in the list.

The transmission message generator 210 of the node generates a NACK Bloom filter that reflects the identified IDs. This NACK Bloom filter is set in the NACK Bloom filter field and is transmitted via the message transmitter 252.

Any method may be used as the method of creating a list of partner nodes (child nodes). One such example is a method that establishes a parent-child relationship of nodes when a network is constructed and the parent node grasps IDs of a plurality of child nodes and the number of the child nodes. The parent-child relationship may be established using a procedure such as a three-way handshake of TCP (Transmission Control Protocol), for example, between two nodes. Since the wireless propagation performance in wireless communication often changes in real time as positions of the nodes or positions of obstacles move and according to changes in weather, temperature and humidity or the like, the configuration of the network is generally set so as to be autonomously changeable to a certain degree. For this reason, a mechanism may also be adopted whereby the parent-child relationship is made changeable following the change in the network configuration. As another method of creating the list, when IDs of all nodes participating in the network can be acquired, all the IDs of the nodes may be registered with the list. After the list is confirmed, the parent node identifies, from the list, IDs of nodes from which the parent node has failed to receive data, for example, in one cycle (time frame) and reflects the IDs in the NACK Bloom filter.

An example of specific operation of the wireless communication device of the second embodiment will be described using FIG. 11. As in the case of the first embodiment, it is assumed that the number of bits of the NACK Bloom filter m=64, the number of child nodes n=7 and the number of hash functions k=6. The node 5 waits to receive messages from seven child nodes.

Suppose that the node 5 has successfully received messages from the nodes 9 and 218, whereas the node 5 has not successfully received messages from the nodes 16, 95, 124, 169 and 241 for some causes. In this case, the node 5 generates a NACK Bloom filter with IDs of the nodes 16, 95, 124, 169 and 241 added. As a result, for example, a NACK Bloom filter is obtained in which bits of (3, 5, 11, 19, 23, 24, 34, 35, 38, 42, 44, 45, 49, 54, 55, 59, 62) are set to "1."

The node 5 stores this NACK Bloom filter in the NACK Bloom filter field (see FIG. 14) of the message and transmits the message. The seven child nodes which have received the messages transmitted by the node 5 analyze the NACK Bloom filter included in the messages to thereby verify whether or not each message transmitted has been normally received by the node 5.

For example, upon receiving the message from the node 5, the node 9 verifies whether or not a bit group corresponding to a hash value sequence (39, 43, 36, 22, 32, 55) generated based on the ID of the own node are set to "1." Since the bit group corresponding to 39, 43, 36, 22 and 32 are not "1" (are "0"), the node 9 judges that no NACK information has been transmitted to the own node, that is, the message transmitted by the own node has been successfully transmitted by the node 5.

The node 95 also verifies whether or not a bit group corresponding to a hash value sequence (19, 5, 2, 42, 23, 45) of the own node are set to "1." Since the bit group corresponding to this hash value sequence are "1," the node 95 judges that the message transmitted by the own node has not been correctly received (has failed in reception) by the node 5. In this case, the node 95 may transmit a message including data to be retransmitted. A specific operation of retransmission will be described later in detail in a sixth embodiment. Alternatively, the controller 259 of the node 95 may release the connection with the node 5 and set a node different from the current parent node as a parent node.

When communication between the parent and child nodes consecutively fails more than a predetermined number of times, the connection between the parent and child nodes may be released. When communication consecutively fails more than the predetermined number of times, the parent node 5 releases the connection unilaterally, but if the node 169 still recognizes that the connection with the parent node 5 is maintained, the node 169 may falsely assume that the transmission has been successful and delete the message since the ID of the own node is not included in the NACK Bloom filter in the message received from the node 5 despite the fact the transmission has failed.

Such a problem can be prevented using the following method.

Figure 15:
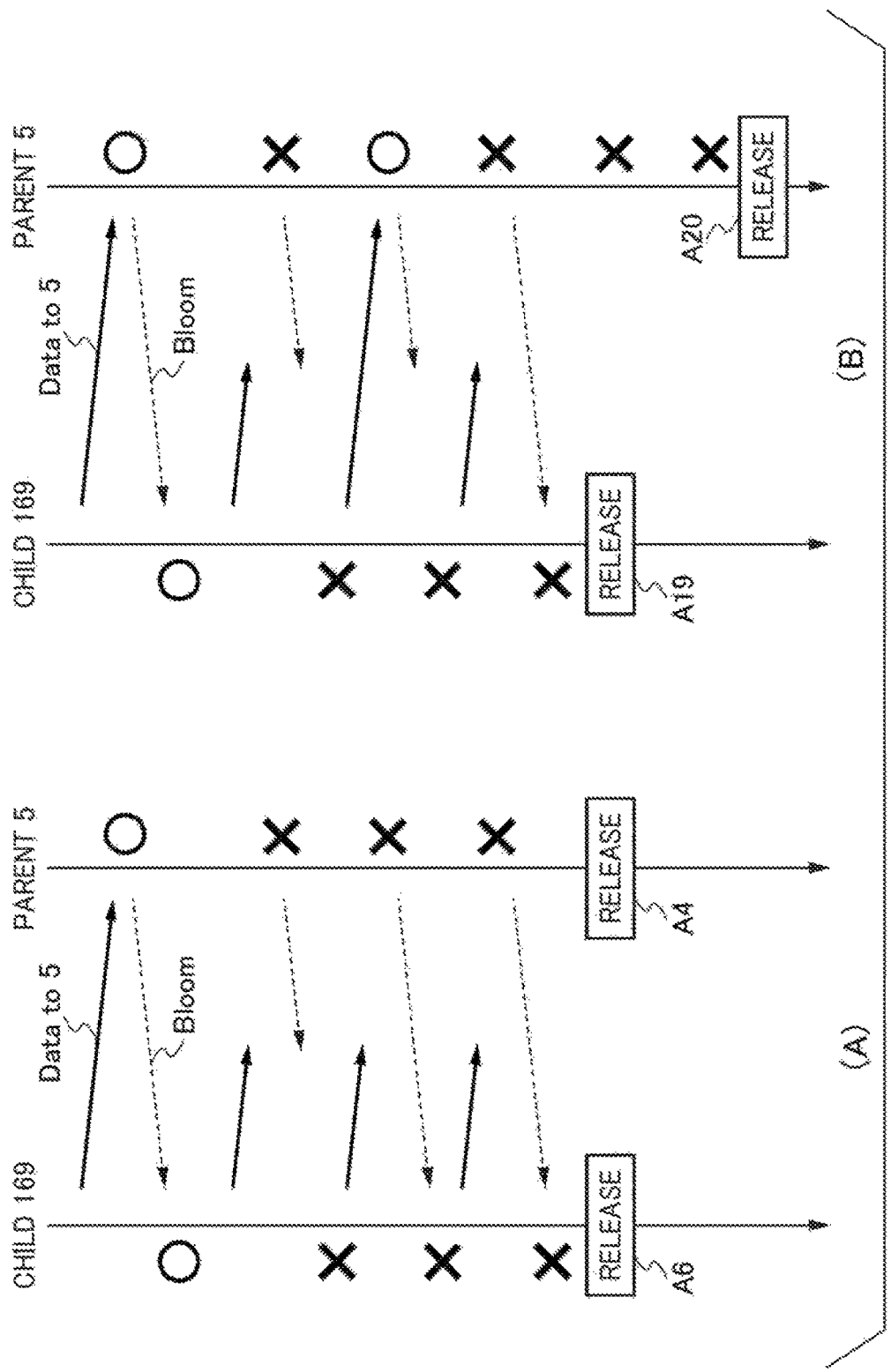
FIG. 15 is a diagram illustrating an example of release of connection between nodes according to the second embodiment.

As an example, the parent node releases the connection when communication is interrupted three times consecutively, while on the other hand, the child node releases the connection when at least one of a case where communication is interrupted three times consecutively and a case where NACK information is received occurs. FIG. 15(A) and FIG. 15(B) show examples of a connection release sequence. Marks "○" mean that a message has been normally received (successfully received).

Marks "×" on the parent node 5 side mean that a message has not successfully been received (failed in reception) from the child node 169. Marks "×" on the child node 169 side mean that a message has not been received (failed in reception) from the parent node 5 or that although the message has been received, the ID of the own node is not included in the NACK Bloom filter.

Arrowed solid lines from the child node 169 to the parent node 5 mean transmission of a message from child node 159 to the parent node 5. Arrowed long broken lines from the parent node 5 to the child node 169 show a case where the ID of the own node is included in the NACK Bloom filter and short broken lines show a case where reception of a message has failed. The parent node 5 releases the connection with the child node 169 when such a failure is repeated three times consecutively (A4). After that, when the child node 169 confirms that the own ID is included in the NACK Bloom filter (A5), the child node 169 releases the connection with the parent node 5 (A6). In this case, without discarding the data to be retransmitted, the child node 169 transmits data to a newly set parent node, or waits for the next communication opportunity to transmit the data.

On the other hand, according to an example in FIG. 15(B), the child node 169 interrupts communication with the parent node 5 first (A19) and then the parent node 5 interrupts communication with the child node 169 (A20). Thus, by allowing the child node side to interrupt communication first, it is possible to prevent the child node from discarding a message, transmission of which has failed or data included therein.

Thus, at a point in time at which communication has failed the same number of times, both the parent node and the child node are configured to release the connection. As a result, the child node side interrupts the connection first. Alternatively, even when the parent node disconnects the connection first, the child node releases the connection before the next retransmission timing while the child node continues to judge that transmission is not successful. It is thereby possible to prevent the child node from discarding data to be retransmitted.

As another method, for example, when a success rate of communication for a certain number of times (e.g., 10 times) falls below a threshold (e.g., 60%), the controller 259 of the node may release the connection. In this case, the parent node is configured so as not to release the connection with the child node unilaterally. As in the case described above, this prevents the child node from discarding data to be retransmitted.

In the present embodiment, collision of hash values, that is, false detection of NACK information may also occur. For example, when the node 5 normally receives a message transmitted from the node 169 and fails to receive a message transmitted from another child node, a union of hash value sequences of the other child node may include hash value sequences of the node 169. At this time, the child node 169 which has received the NACK Bloom filter from the parent node 5 recognizes that data transmission to the node 5 has failed based on a false-positive indication. However, even when such an false detection occurs, it is possible to increase reliability of the node and the network by setting the node 169 so as to retransmit the message including the same data to the node 5.

Note that when only an ID is available as an argument of a hash function, and the hash function is not updated, a possibility that false detections occur for several time frames consecutively increases. For this reason, an argument may be defined using parameters (seed values) such as sequence numbers to identify a transmission destination of NACK information in addition to the ID. Alternatively, a mechanism such as changing a hash function to be used based on the sequence number may be adopted.

Regarding a wireless network, the network is preferably constructed by setting a node where communication is relatively stable as a parent node or a child node.

In such a situation in which communication is relatively stable, the number of elements (the number of child nodes) "n" reflected in the NACK Bloom filter can be reduced. As a result, it is also possible to reduce the false detection rate for the same bit string length (bitmap length) "m" compared to the ACK Bloom filter of the first embodiment. Therefore, to achieve a false detection rate equivalent to that of the first embodiment, the bit string length "m" of the NACK Bloom filter can also be reduced. It is thereby possible to reduce the message length.

For example, a network is assumed, as in the case described in the first embodiment, in which the bitmap length m=64 and the number of child nodes, is on the order of seven. The number of elements n, that is, the number of destination nodes to which NACK information is transmitted is estimated to be on the order of two or three. At this time, the value of k for n={2, 3} becomes k={22.18, 14.79} ~={22, 15} according to k=(m/n)·ln 2, where "~=" stands for "being nearly equal." For such a combination of n and k, the probability of a false detection is all 0.01% or less in all cases, which is an extremely low value. In the case where k=22 is adopted which is calculated by assuming n=2, even in a situation in which NACK information actually needs to be transmitted to as many as n=6 child nodes, the false detection rate becomes on the order of 1.3%, which can still be considered as a sufficiently small value. This is the order of probability that can be sufficiently ignored depending on the system requirements. In this way, when the false detection rate is sufficiently low, the transmission efficiency can be further increased by setting a shorter value such as bit string length m=48.

As described above, according to the present embodiment, it is possible to efficiently notify NACK information. Especially when the NACK Bloom filter is included in a message to be transmitted to a parent node, it is possible to more efficiently transmit data. It is thereby possible to reduce power of the wireless communication device and the network.

Third Embodiment

In the first embodiment and the second embodiment, ACK information and NACK information to one or a plurality of nodes are expressed by a Bloom filter, while in the present embodiment, destination information on one or a plurality of nodes is expressed by a Bloom filter. Hereinafter, description will be given focusing on differences from the first embodiment and the second embodiment.

Figures 16, 17:
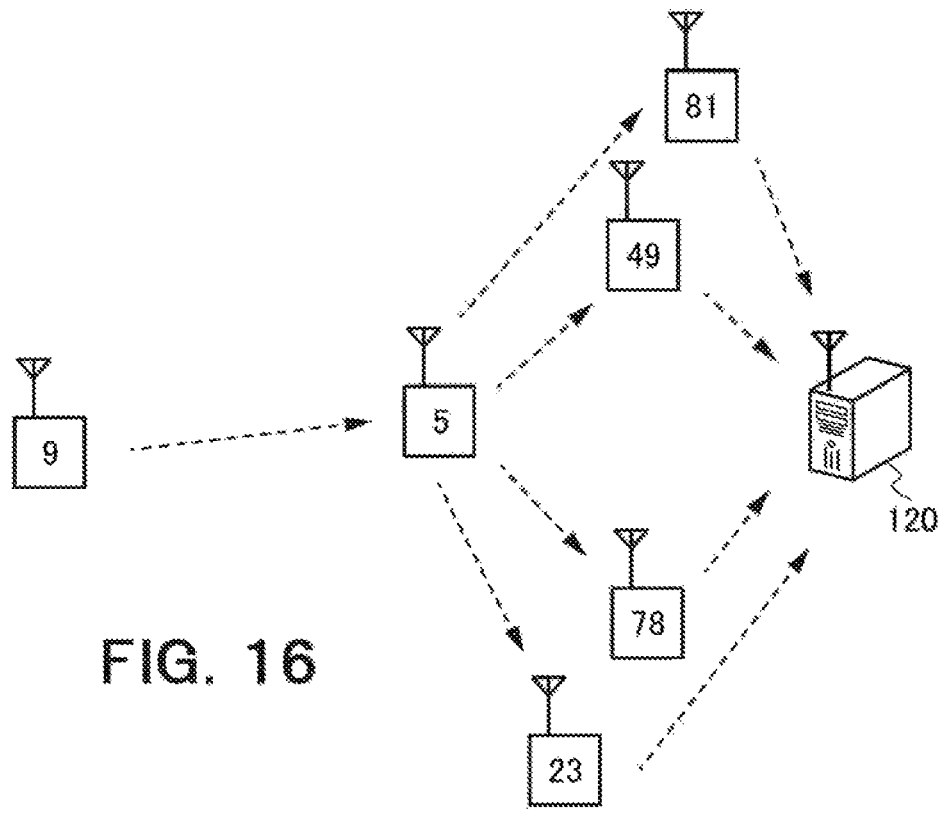
FIG. 16 is a diagram illustrating an example of a multihop wireless network according to a third embodiment.
FIG. 17 is a diagram illustrating an example of a message format according to the third embodiment.

FIG. 16 illustrates an example of a multihop wireless network according to the present embodiment. The concentrator 120 establishes connections with nodes 23, 49, 78 and 81. A node 5 is a child node of these nodes 23, 49, 78 and 81. A node 9 is a child node of the node 5. In the case of such a network configuration, the node 5 needs to communicate, with the concentrator 120 through at least one of the nodes 23, 49, 78 and 81. The node 5 selects a plurality of parent nodes from among the nodes 23, 49, 78 and 81. The ranks described in the first embodiment may be used as indices to select the parent nodes. For example, a plurality of parent nodes may be selected from among nodes having a minimum rank value with priority.

FIG. 17 is an example of a message format according to the present embodiment. This format includes a destination Bloom filter field and a payload field. The format may further include a payload length field. A Bloom filter (destination Bloom filter) to which IDs of a plurality of destination nodes (parent nodes or child nodes) are added is stored in the destination Bloom filter field. A field length of the destination Bloom filter is 6 [Bytes]. The destination node group refers to a set of parent nodes, a set of child nodes or a set of parent nodes and child nodes, to which a message is transmitted. The destination Bloom filter field is an example of a first field in which a bitmap according to the present embodiment is stored. A payload length and a payload are similar to those in the first embodiment. The format shown in FIG. 17 is simply shown by way of example and various variations are possible as in the case of FIG. 7 and FIG. 14.

Figures 18, 19:
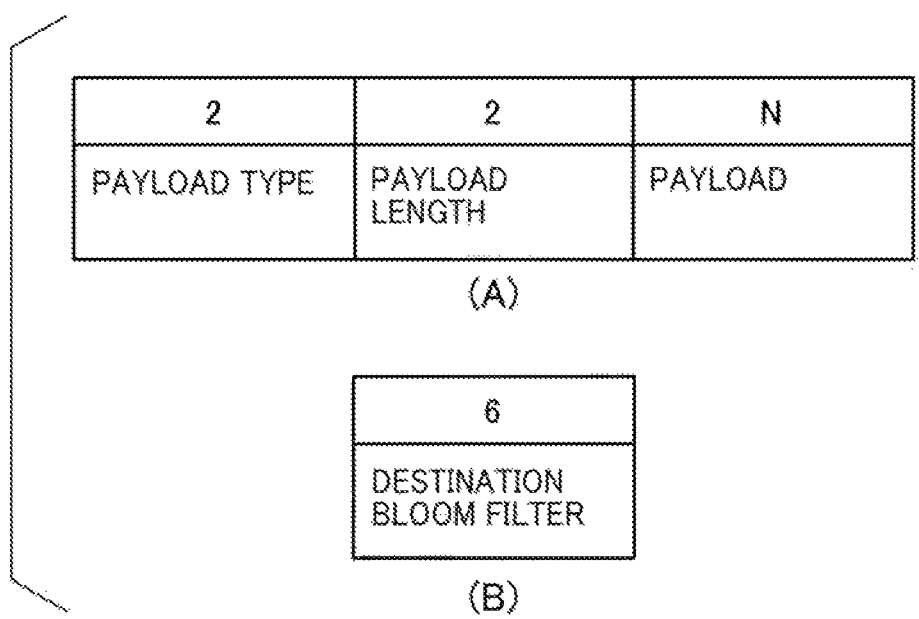
FIG. 18 is a diagram illustrating examples of hash value sequences according to the third embodiment.
FIG. 19 is a diagram illustrating another example of a message format according to the third embodiment.

Communication operation according to the present embodiment will be described. FIG. 18 illustrates examples of hash value sequences calculated from four hash functions "$H_0$", "$H_1$", "$H_2$" and "$H_3$" based on IDs of the nodes 9, 23, 49, 78 and 81 respectively. An argument of each hash function may be defined by additionally using information such as a frame number in addition to an ID or a hash function to be used may be changed in accordance with information of a frame number or the like.

Suppose the node 5 selects the nodes 49 and 78 as its own parent nodes. When generating a message, the node 5 adds IDs of the nodes 49 and 78 to the Bloom filter (destination Bloom filter). Bits corresponding to (2, 6, 13, 20, 22, 38, 53) which is a union of hash value sequences of the node 49 and 78 are set to "1." After that, the node 5 transmits a message, in a destination Bloom filter field of which the destination Bloom filter is set. Note that necessary values and data are set in the payload length field and the payload field in the message.

The nodes 23, 49, 78 and 81 which are upper adjacent nodes of the node 5 receive messages transmitted from the node 5. The received message analyzer 220 of the nodes 23, 49, 78 and 81 verifies whether or not the node ID of the own node is included in the destination Bloom filter included in the destination Bloom filter field. That is, the received message analyzer 220 verifies whether or not bit groups corresponding to hash value sequences calculated based on the node ID of the own node are set to "1" in the destination Bloom filter. When the bit groups are all set to "1," the nodes 23, 49, 78 and 81 judge that the node ID of the own node is included, that is, that the message is directed to the own node. Upon judging that the node ID of the own node is included, the nodes 23, 49, 78 and 81 transmit a payload of the message to the concentrator 120.

On the other hand, the nodes 23 and 81 judge from the verification result of the destination Bloom filter that the ID of the own node is not included in the destination Bloom filter, that is, that the message is not directed to the own node. The received message analyzer 220 or the controller 259 of the nodes 23 and 81 may discard the received message or save a part or whole of the message so that the message may be used for reconstruction of the network or used for debugging or the like.

Furthermore, the controller 259 of the node 5 checks wireless link quality with respect to the nodes 49 and 78 or among those nodes, and if none of the wireless link quality satisfies the standard (not good), the node 81 may be added as a third parent node.

Furthermore, in the present embodiment, IDs of child nodes (node 9 in the example in FIG. 16) may be added to the destination Bloom filter in addition to parent nodes. Note that regarding calculations of hash functions, hash functions may be calculated in similar ways for the parent nodes and for the child nodes. Alternatively, the parent nodes may use their IDs as arguments of hash functions and the child nodes may use numerical values obtained by adding a certain value (e.g., 1000) to the ID values as arguments of hash functions. The controller 259 may control such arguments of hash functions in accordance with the types of the parent and child nodes.

Since communication among nodes is carried out wirelessly, it is highly possible that wireless signals transmitted from the node 5 may reach not only the parent nodes 49 and 78 but also the child node 9. By specifying not only the parent nodes but also the child node 9 using the destination Bloom filter in this way, it is possible to transmit more information by one time of transmission.

For example, the node 5 transmits data (sensor data or the like) to the parent nodes 49 and 78 and also transmits data (rank update information) to the child node 9 in the same message as well. In this case, two types of submessages: sensor data and rank update information are entered in the payload field. Destination information may also be added to the header of each submessage. That is, destination information of the parent nodes 49 and 78 is included in the header of the submessage including the sensor data and destination information of the child node 9 is included in the submessage header including rank update information. The destination information may be an identifier of a node such as a node ID or may be expressed by the destination Bloom filter.

Note that it may be possible to judge, based on the contents of the submessage, whether the submessage should be transmitted to lower adjacent nodes or should be transmitted to upper adjacent nodes (especially parent node among them). In this case, the destination information may not necessarily be included in the header of the submessage. For example, based on the type included in the submessage, each node may judge the direction in which the submessage should be transmitted. Alternatively, if the payload length is fixed with respect to the type of information, it is also possible to judge the submessage to be received by the own node from the position in the payload of the submessage. As a matter of course, the submessage to be received may also be judged using any methods other than the method described here. Such a judgment may be made by the received message analyzer 220 or the controller 259.

As described above, according to the present embodiment, it is possible to realize efficient communication by expressing destination information of a plurality of nodes using the Bloom filter.

As a first modification of the present embodiment, the destination Bloom filter may be omitted from a message to be transmitted on the assumption that parent nodes are not frequently changed. The destination Bloom filter may be entered in the message only when a specific condition is established. Examples of cases where a specific condition is established include when a parent node is changed or when the time of a network health check is reached for every predetermined period. This allows a destination Bloom filter to be transmitted intermittently. FIG. 19(A) shows an example of a message format used in the first modification.

The message format in FIG. 19(A) is provided with a payload type field, a payload length field and a payload field. When the destination Bloom filter is transmitted, a message including only the destination Bloom filter shown in FIG. 19(B) (information update message of the parent node) may be transmitted instead of setting the destination Bloom filter in the payload field. A plurality of types of information may also be transmitted together by further adding information other than the destination Bloom filter to the payload field.

Figure 20:
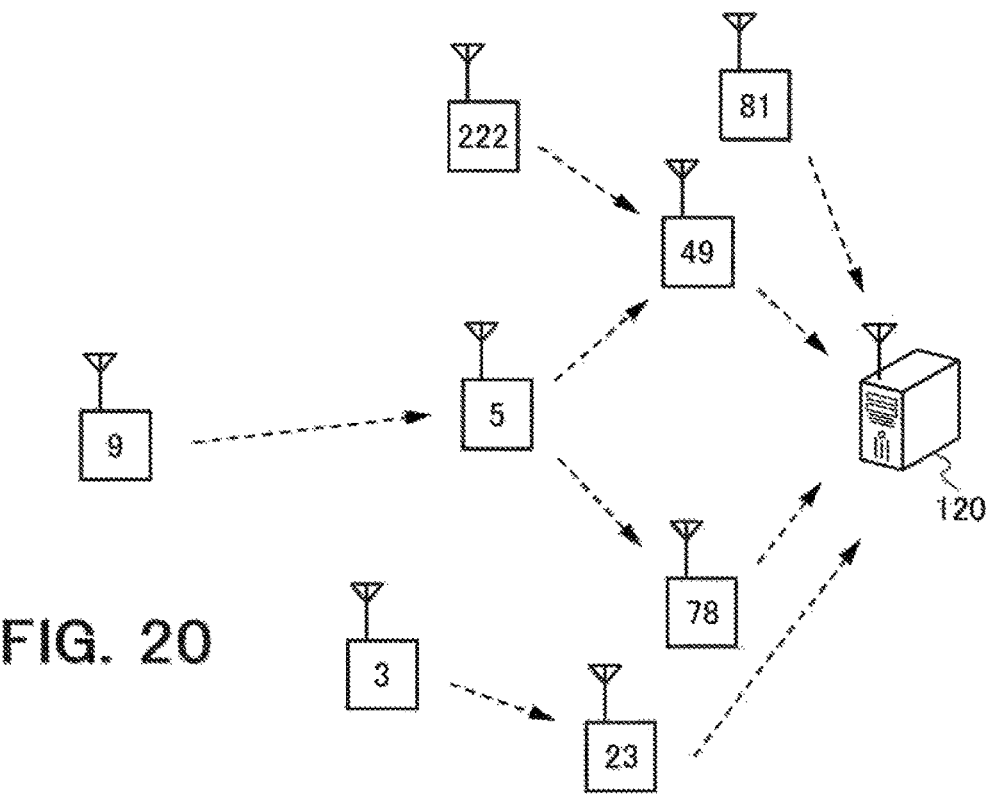
FIG. 20 is a diagram illustrating another example of a multihop wireless network according to the third embodiment.

As a second modification of the present embodiment, an ID of a node existing in a route (relay route) through which the message should pass is expressed by the Bloom filter (destination bloom filter). The destination Bloom filter is stored in the destination Bloom filter field of the message. FIG. 20 shows another example of the multihop wireless network according to, the present embodiment. Note that the concentrator 120 grasps a network configuration.

A case where the concentrator 120 transmits a message such as an operation stop instruction to the node 9. In this case, the concentrator 120 transmits a message, in which the destination Bloom filter to which the IDs 49, 78, 5 and 9 are added is set using, for example, the message format in FIG. 17. The nodes 49 and 78 judge that the ID of the own node is included in the destination Bloom filter (verification result shows positive), and further transfers the payload data (operation stop instruction) included in the message to the lower adjacent node 5. During the transfer, the nodes 49 and 78 each generate a destination Bloom filter to which the IDs of the nodes 5 and 9 are added and set the destination Bloom filter in the destination Bloom filter field. Alternatively, the nodes 49 and 78 may use the destination Bloom filter included in the received message as is.

By confirming a relay route from the concentrator 120 to the node 9 as described above, it is possible to prevent power consumption from increasing in nodes having nothing to do with the relay. By specifying route information in the message, it is possible to prevent an unintentional transfer by the node and suppress an increase in power consumption.

Note that even if a false detection (false positive) occurs caused by collision of hash values in the destination Bloom filter, it is possible to avoid loss of the message attributable to the false detection.

As a third modification of the present embodiment, it is also possible to add an ID of a partner node for which a connection establishment request is transmitted to the Bloom filter (destination Bloom filter). A specific example will be described using FIG. 16. Suppose that a certain time has elapsed after turn on power supply to the node 5. The node 5 transmits a connection establishment request message with the ID 49 and the ID 78 added to the destination Bloom filter. Since the verification result proves to be positive, the nodes 49 and 78 perform processing for establishing a connection with the node 5. Since the verification result is negative, the nodes 23 and 81 discard, for example, the message.

Assume a case where collision of hash values has occurred in the present third modification. For example, in spite of the fact that the node 5 has no intention to make connection with the node 81, the node 81 falsely recognizes that it has received a connection request from the node 5. In this case, the node 5 may not proceed to establishment of a connection with the node 81 but stop the procedure halfway. Alternatively, the node 5 may establish connection with the node 81 temporarily and then carry out procedures for releasing the connection. Note that there is no problem with loss of data to be transmitted (retransmitted) caused by false detection (false positive) in the present third modification either.

Fourth Embodiment

In the first embodiment to the third embodiment, any one type of information of ACK information, NACK information and destination information is expressed by a Bloom filter, whereas in the present embodiment, at least two types of information are collectively expressed by one Bloom filter. Hereinafter, description will be given focusing on differences from the first embodiment to the third embodiment.

Figure 21:
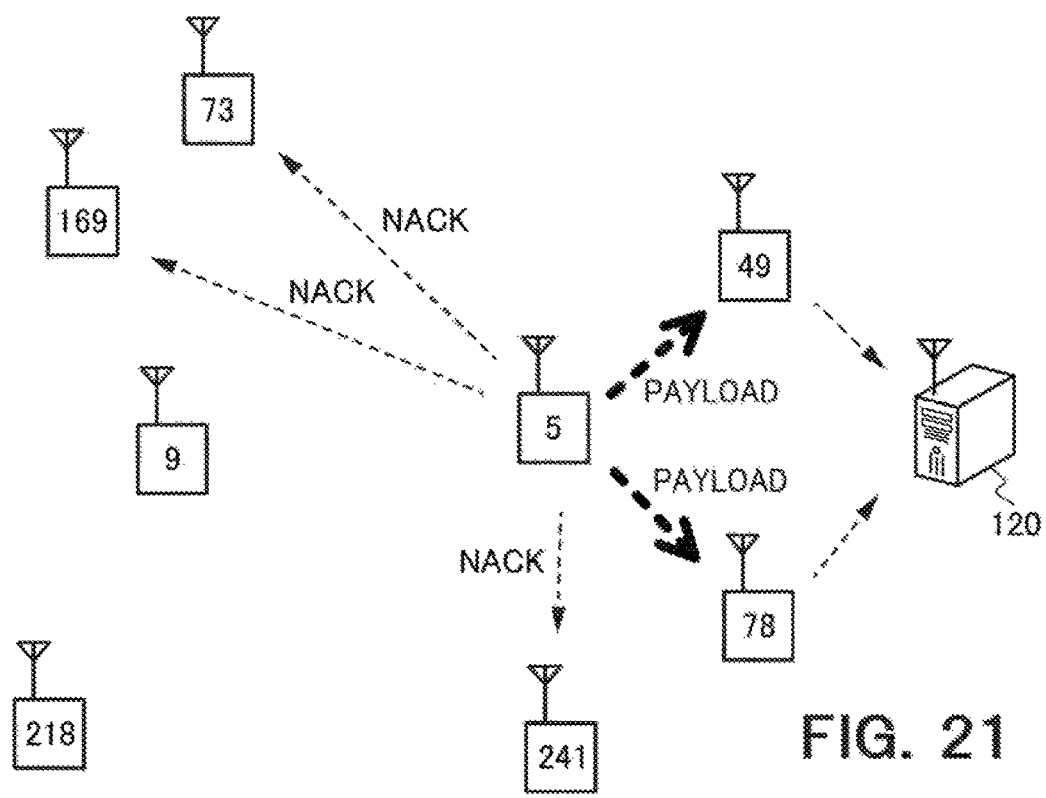
FIG. 21 is a diagram illustrating an example of a multihop wireless network according to a fourth embodiment.

FIG. 21 illustrates an example of a multihop wireless network according to the present embodiment. Suppose this network can accommodate 256 nodes and each node is assigned a node ID with a value ranging from 0 to 255. In such a network, the node 5 has already received data from the child nodes 9 and 218 and is trying to transmit (relay) the data to the parent nodes 49 and 78. In the present embodiment, the data is transmitted (relayed) to the parent nodes 49 and 78 through one time of message transmission and NACK information is transmitted to the child nodes 73, 169 and 241.

More specifically, the node 5 uses its node ID as an argument of hash function regarding the destination node of the data, and uses a numerical value obtained by adding 256 to the node ID as an argument of hash function regarding the destination node of NACK information.

The above-described configuration may be modified so as to transmit ACK information instead of transmitting NACK information.

Note that in the above-described example, one node is specified as a destination for one item of information (NACK information, ACK information or data), but a configuration is also possible in which one node is specified as a destination of a plurality of types of information. Furthermore, when a message is received from a parent node, ACK information or NACK information may also be transmitted to the parent node. In this case, ACK information or NACK information directed to the parent node can be included in the destination Bloom filter using the aforementioned method. Furthermore, both ACK information and NACK information may also be added to the destination Bloom filter. In the aforementioned example, the argument calculation expression (definition) differs between the data destination and the NACK information (or ACK information) destination, but there can also be a mode in which the same argument calculation expression is used. In the above-described example, a numerical value obtained by adding 256 to the node ID is used as an argument of hash function for the destination of NACK information (or ACK information), but the value to be added is not limited to 256. One Bloom filter simultaneously expresses all or some of destinations of a plurality of types of information (ACK information, NACK information and payload), and can thereby realize more efficient communication.

Fifth Embodiment

In the present embodiment, each node adds a function calculation result based on the ID of the own node to a Bloom filter included in a received message and transfers the message in which the Bloom filter with the added function calculation result is set to a parent node. Each node on the route repeats such an operation and the concentrator that eventually receives the message analyzes the Bloom filter included therein, and can thereby grasp through which routes (that is, which nodes) the message passes and reaches the concentrator.

Figures 22, 23, 24:
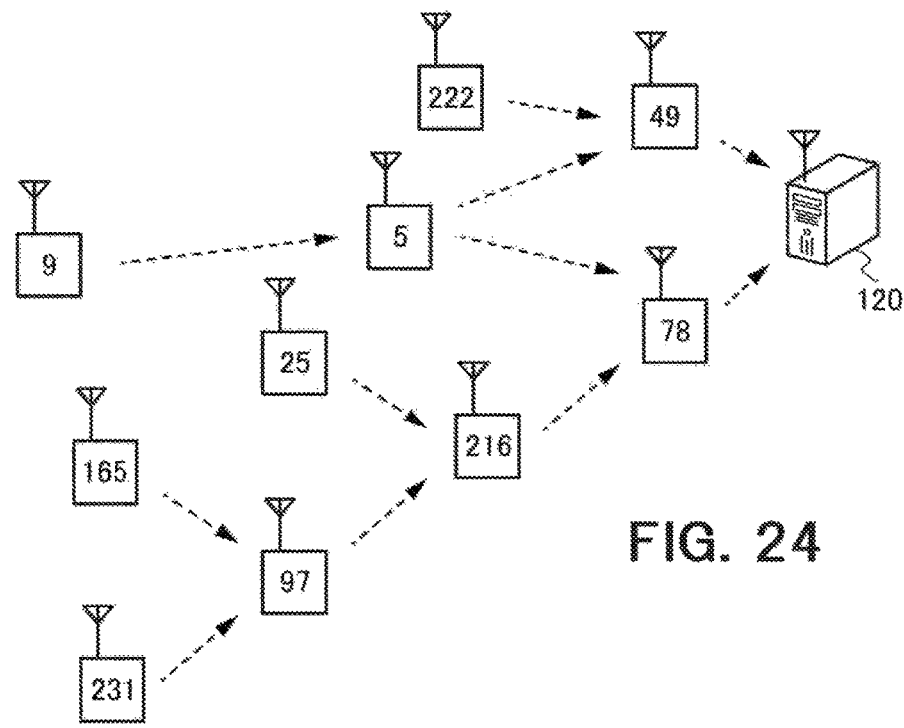
FIG. 22 is a diagram illustrating an example of a message format according to a fifth embodiment.
FIG. 23 is a diagram illustrating another example of the message format according to the fifth embodiment.
FIG. 24 is a diagram illustrating another example of the multihop wireless network according to the fifth embodiment.

FIG. 22 illustrates an example of a message format according to the present embodiment. This message format is provided with a destination ID field of 1 [Byte], an intermediate route Bloom filter field of 8 [Bytes], and a payload message array field of N×M [Bytes] (hereinafter referred to as "array field"). The message format may further include a sender ID field of 1 [Byte] and a payload message number field of 2 [Bytes]. The array field can store M array elements each having N [Bytes]. The intermediate route Bloom filter field is a field to store a Bloom filter (intermediate route Bloom filter) reflecting node IDs on the route from a certain node to the concentrator 120.

Operation of the wireless communication device 110 according to the present embodiment will be described. In FIG. 20, the node 5 receives a message from the node 9, confirms that the destination of the message is the own node and then adds to the intermediate route Bloom filter included in the message, a calculation result of a function based on the own node ID (=5). Next, the node 49 receives messages from the node 5 and the node 222 and generates an intermediate route Bloom filter in which IDs of four nodes 5, 9, 49 and 222 are set. The node 49 stores the Bloom filter in the intermediate route Bloom filter field. The node 49 transmits the message generated in this way to the concentrator 120.

The concentrator 120 verifies the intermediate route Bloom filter and recognizes that the nodes 5, 9 and 222 exist as descendant nodes of the node 49 which is the sender of the message.

Since the concentrator 120 can efficiently transmit the message to the descendant nodes of the node 49 via only the node 49, the concentrator 120 can thereby prevent nodes other than the node 49 from processing the message and attain power saving. Each node increments and updates the number of payload messages of the received messages and can then transmit them to other nodes. Each node can add the data generated to the payload message array and transmit it to other nodes. Note that in a format example in FIG. 22, since a sender ID field is provided, the node 9 (see FIG. 20) may transmit the message without adding the ID of the own node to the intermediate route Bloom filter. The node 5 on the receiving side needs only to acquire the ID (=9) of the node 9 from the sender ID field of the message and add it to the intermediate route Bloom filter. In this way, the number of elements to be added to the intermediate route Bloom filter is decremented by "1". This makes it possible to reduce the probability of collision among hash value sequences.

Figure 14:
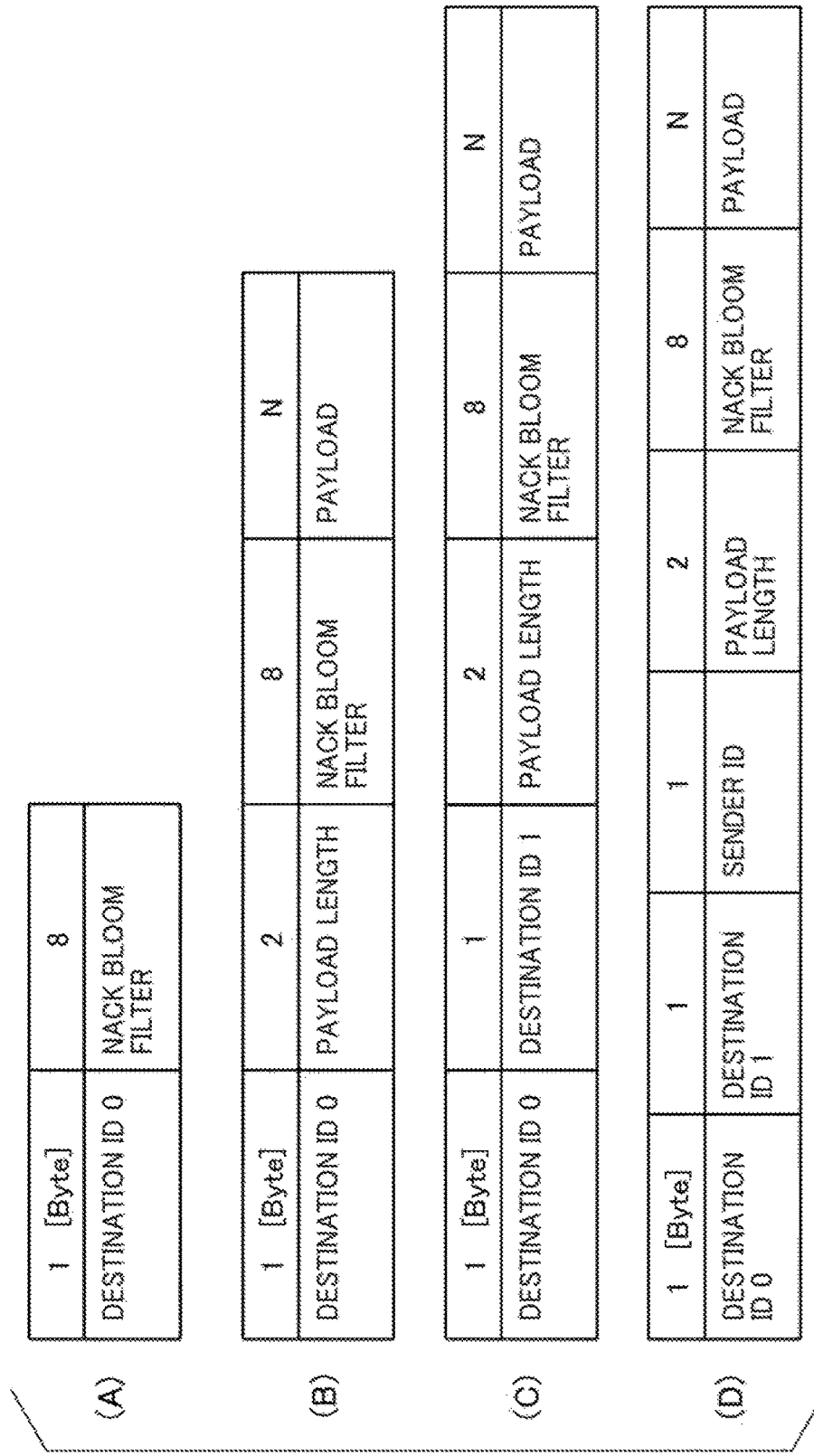
FIG. 14 is a diagram illustrating an example of a message format according to a second embodiment.

FIG. 23(A) illustrates another example of the message format in the present embodiment. The message in FIG. 23(A) is provided with, a destination ID 0 field, a destination ID 1 field, a sender ID field, a payload message number field, and a payload message array field of N×16 [Bytes] (hereinafter referred to as "array field"). FIG. 23(B) illustrates a format example of the array field in FIG. 23(A). The array field is provided with an intermediate route Bloom filter field of 8 [Bytes], a sensing node ID field of 2 [Bytes], a temperature sensor value field of 2 [Bytes], and a sensing time field of 4 [Bytes]. The format in FIG. 23 is an example and a variety of variations are possible as shown in FIG. 7 or FIG. 14 and the like.

In FIG. 23(B), the sensing node ID field is a field for storing the ID of the own node. The temperature sensor value field is a field for storing a value detected by the temperature sensor of the own node (temperature sensor value) and the sensing time field is a field for storing, the detection time. The intermediate route Bloom filter field is the same as that shown in FIG. 22. Note that the temperature sensor value and sensing time fields in FIG. 23(B) are no more than examples. At least one of these fields may be substituted by another field or other fields may be added thereto.

Operation using the message format in FIG. 23(A) will be described with reference to FIG. 20. The node 9 stores "5" which is the parent node ID in the destination ID 0 field and stores "9" which is the ID of the own node in the sender ID field. The destination ID 1 field is a field for, when there are two or more destinations (parent nodes), storing the second transmission destination. In FIG. 20, since there is only one destination (parent node) of the node 9, an invalid value, for example, "0" is stored in this destination ID 1 field (in this case, a node whose ID is "0" is assumed to be non-existent in the network). Payload data is generated according to the format in FIG. 23(B). More specifically, an intermediate route Bloom filter, all bits of which are set to "0" is stored in the intermediate route Bloom filter field, "9" which is the own node ID is stored in the sensing node ID field, and a temperature value detected from a temperature sensor and the detection time are stored in the temperature sensor value field and the sensing time field respectively. The node 9 stores the payload data generated in a 0th array element of the array field in FIG. 23(A). The node 9 transmits the message generated in this way.

The node 5 which has received the message from the node 9 sets the destination ID 0 field of the received message to "49," sets the destination ID 1 field to "78," sets the sender ID field to "5," and further sets "2" in the payload message number field. Furthermore, the node 5 generates payload data according to the format in FIG. 23(B) and stores the payload data generated in a first array element of the array field (the 0th array element includes the payload data added by the node 5). The node 5 adds the ID of the own node to the intermediate route Bloom filter included therein for all the array elements of the array field in the received message (here, only the 0th array element exists in the array field). In the present embodiment, the ID (=5) of the own node is added to the intermediate route Bloom filter included in the 0th array element. The node 5 transmits the message generated in this way.

The node 49 which has received the message from the node 5 generates a message through processing similar to that of the node 5 and transmits the message to the concentrator 120. However, since the node 49 also receives a message from the node 222, the node 49 performs processing of combining the two messages received from the two nodes of the node 5 and the node 222. For example, all the array elements in the array field of the message received from the node 222 are extracted and added to the array field of the message received from the node 49. Alternatively, conversely, all the array elements in the array field of the message received from the node 49 are extracted and added to the array field of the message received from the node 5. The ID of the own node is added to the intermediate route Bloom filter in each array element. The node 49 also adds the payload data generated by the own node to the array field as an array element. As a result of such processing, the number of payloads included in the message transmitted from the node 49 becomes four and four array elements are included in the array field.

The concentrator 120 which has received the message from the node 49 analyzes the intermediate route Bloom filter of each array element of the array field, and can thereby grasp through which nodes the four pieces of payload data have been transmitted. For example, when the node 9 is checked, by specifying a payload, the sensing node ID field of which is 9 and analyzing the intermediate route Bloom filter in the payload, it is possible to know that the payload of the node 9 has been transmitted via the nodes 5 and 49. Similarly, it is possible to know that the payload data generated by the node 5 and the payload data generated by the node 222 have been transmitted to the concentrator 120 via the node 49. It is also possible to know that the payload data generated by the node 49 has reached the concentrator 120 without passing through other nodes. The concentrator 120 may generate information indicating a network structure which is lower than the node 49 based on the above-described information.

An argument of a hash function is not limited to a node ID, but a numerical value obtained using a parameter such as the number of hops may be used as an argument in addition to the node ID. In the network example in FIG. 20, the number of hops of the concentrator 120 is "0," the number of hops of the node 49 is "1," the number of hops of the node 5 is "2," and the number of hops of the node 9 is "3." Thus, a numerical value obtained by multiplying the number of hops by 1000 (the number of hops×1000) plus the node ID may be used as an argument. That is, a message transmitted to the concentrator 120 after passing through the nodes 9, 5 and 49 stores an intermediate route Bloom filter to which {3009, 2005, 1049} is added. By so doing, although the amount of calculation required for verification increases, the concentrator 120 and the relay node can recognize not only the list of descendant node IDs but also the number of hops of each node. That is, the intermediate route Bloom filter can include information of the number of hops.

Here, there can be a possibility that false recognition caused by collision of hash values may occur also in the present embodiment as in the case of the other embodiments.

For example, a case will be considered where in a Bloom filter to which IDs of the node 78 and its descendant nodes in FIG. 20 are added, all bits corresponding to hash value sequences based on the ID of the node 222 are set to "1." That is, the union of hash value sequences of the node 78 and its descendant nodes completely includes hash value sequences of the node 222. In this case, the concentrator 120 cannot distinguish whether the node 222 is a descendant node of the node 49 or a descendant node of the node 78. Especially when the node 78 includes many descendant nodes, the Bloom filter included in a message transmitted from the node 78 to the concentrator 120 has a high possibility that relatively many bits may be set to "1" and the possibility of collision of hash values is also high.

FIG. 24 illustrates an example of a network in which a node 78 includes many descendant nodes. A case will be described where a union of hash value sequences of nodes 97, 165 and 231 completely includes hash value sequences of a node 222, while on the other hand, a union of any two hash value sequences of the nodes 97, 165 and 231 does not completely include the hash value sequences of the node 222. Note that only node IDs are assumed to be arguments of hash functions to generate a Bloom filter.

When collision of such hash values occurs, if the concentrator 120 transmits a message (e.g., control command message) to the node 222, the concentrator 120 transmits the message to both the nodes 49 and 78. This ensures that the message arrives at the node 222. Furthermore, as in the case of the aforementioned embodiments, in addition to the case where only node IDs are used as arguments of hash functions, arguments can also be defined from the node IDs and parameters (seed values). Time-dependent elements such as a frame number may also be used as the parameter. This makes it possible, for example, to always reduce the possibility that the union of hash value sequences of the nodes 97, 165 and 231 will continue to completely include hash value sequences of the node 222. The node 78 stores the intermediate route Bloom filter received over past several time frames. The controller 259 of the node 78 may compare these intermediate route Bloom filters to detect nodes which do not exist in descendant nodes of the own node. In the case of the present embodiment, the node 78 is considered to be likely to come to judgment that the node 222 does not exist in descendant nodes of the own node.

However, it is difficult to draw such judgment from only the intermediate route Bloom filter recently received and stored. Therefore, it is also possible to correct information obtained from the intermediate route Bloom filter currently being stored with a Bloom filter collected from other parts of the network, information given through manual operation of a network administrator and information hard-coded to the node.

For example, as shown in the aforementioned example, when it is not possible to judge which of the node 49 or the node 78, the node 222 is descendant from, the concentrator 120 may notify it to the network administrator through a GUI (Graphical User Interface). The network administrator who recognizes the occurrence of the collision of hash values regarding the node 222 via the GUI refers to the node layout and inputs information indicating that the node 222 actually is or highly likely to be a descendant node of the node 49 to the concentrator 120. Based on this information, the concentrator 120 may make a correction that the node 222 is not the descendant node of the node 78. This allows the concentrator 120 to specify the position of the node 222 more accurately.

Furthermore, the network administrator may also input geographic information of the wireless communication device to the concentrator 120 in advance at the time of network setup. An example of the geographic information is information on a geographic layout, positions of obstacles in wireless propagation and estimate values of their influences if possible. Using the geographic information, the concentrator 120 can correctly grasp the network configuration which would not possibly be judged from only the intermediate route Bloom filter and more accurately identify the node position.

When there are many nodes, it is difficult for the network administrator to manually input relationships among all nodes to the system. Furthermore, in the case of a wireless network, it is often difficult for the individual nodes and the concentrator to automatically configure or change network information based on the measured wireless propagation parameter. However, only in the above-described situation where it is uncertain in which route the target node is located, it is very likely that it will be possible to perform a degree of handling such as correcting the network information relatively easily using the GUI, and it is thereby possible to construct the wireless network as a sufficiently practical system.

As described above, according to the present embodiment, by using the Bloom filter; it is possible to carry out communication efficiently. Furthermore, each node can identify nodes through which the message has passed by analyzing the intermediate route Bloom filter included in the message. Such a mechanism helps the concentrator or network administrator grasp the whole picture of the network structure. It is also possible to identify a node on which communication traffic is concentrated. The mechanism can also help construct a routing table to allow a control command message outputted from the concentrator to propagate up to an appropriate node.

Sixth Embodiment

Figure 25:
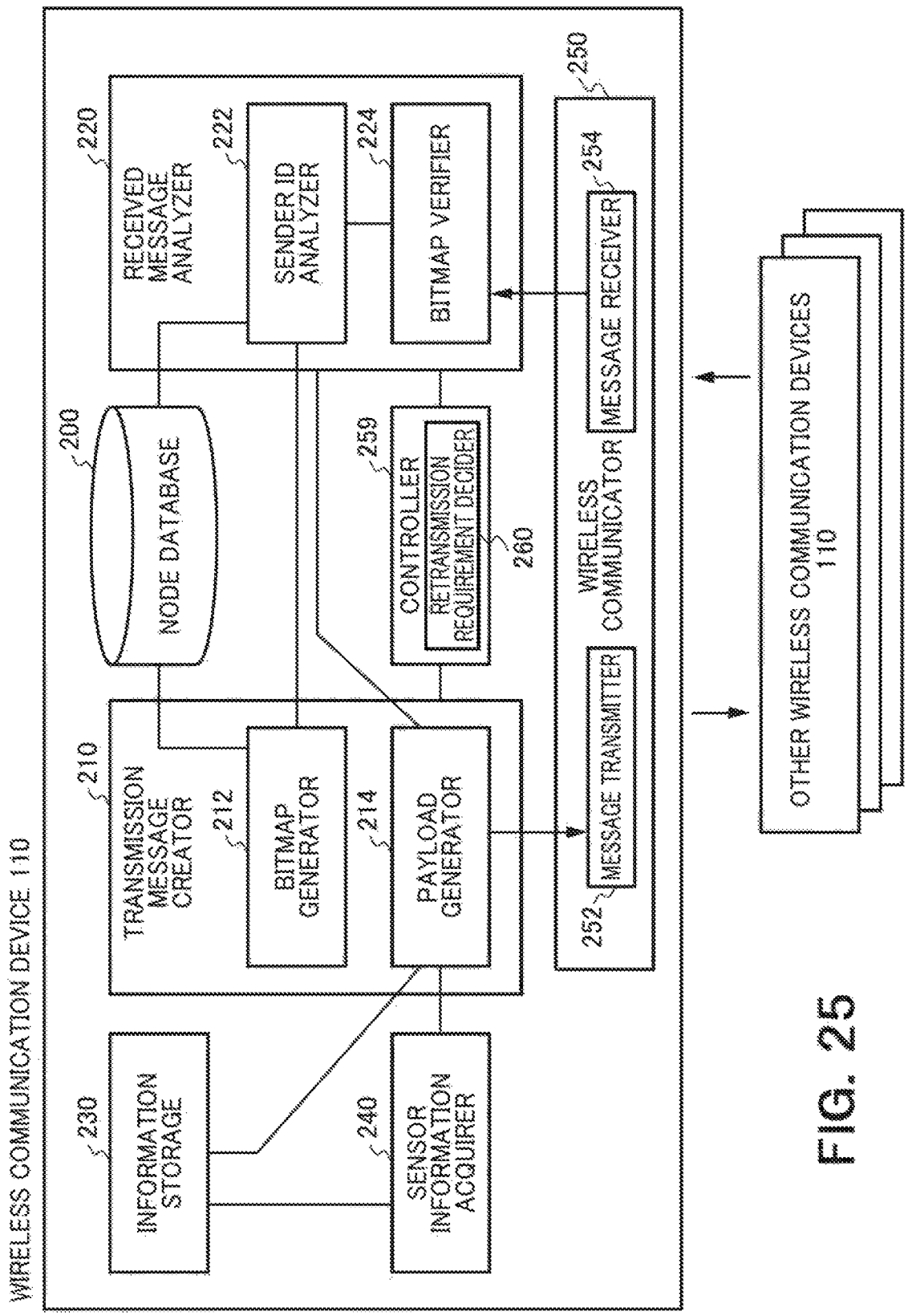
FIG. 25 is a diagram illustrating an example of a wireless communication device according to a sixth embodiment.

FIG. 25 is a block diagram illustrating a configuration of a wireless communication device 110 according to the present embodiment. This wireless communication device 110 is different from the wireless communication device 110 in FIG. 6 in that a controller 259 is provided with a retransmission requirement decider 260. The retransmission requirement decider 260 decides whether or not data should be retransmitted from ACK information or NACK information included in a message received from a parent node (ACK Bloom filter or NACK Bloom filter). The controller 259 is provided with a buffer configured to temporarily store a message or data to be transmitted. Hereinafter, description will be given focusing on differences from the embodiments described so far.

The transmission message generator 210 may store data included in the message transmitted through a slot (transmission slot) assigned to the own node in association with a slot number in a buffer in the controller 259. Alternatively, the whole message may be stored in association with the slot number.

A bitmap verifier 224 extracts a Bloom filter (ACK Bloom filter) from the ACK Bloom filter field of the message received from the parent node. The bitmap verifier 224 then verifies the own node ID based on the ACK Bloom filter and judges whether or not the ID of the own node is included in the ACK Bloom filter. When the own node ID is included in the ACK Bloom filter (when the verification result is positive), it judges that ACK information is returned to the own node and judges otherwise that ACK information is not returned to the own node.

Alternatively, the bitmap verifier 224 extracts the Bloom filter (NACK Bloom filter) from the NACK Bloom filter field of the message received from the parent node. The bitmap verifier 224 then verifies the own node ID based on the NACK Bloom filter and judges whether or not the ID of the own node is included in the NACK Bloom filter. When the own node ID is included in the NACK Bloom filter (when the verification result is positive), it judges that NACK information is returned to the own node and judges otherwise that no NACK information is returned to the own node.

When it judges that no ACK information is returned to the own node or it judges that NACK information is returned to the own node, the retransmission requirement decider 260 judges that the message transmitted by the own node has not normally been received by the parent node and determines that the message needs to be retransmitted. Furthermore, even when the message including the ACK Bloom filter or NACK Bloom filter has not been successfully received from the parent node, it is judged that retransmission of the message is necessary.

When it is judged that retransmission is necessary, the retransmission requirement decider 260 transmits a command for retransmission to a transmission message generator 210. The transmission message generator 210 generates a message in which the data and the slot number transmitted from the buffer in the controller 259 through the above-described transmission slot in the payload field and transmits the message to the parent node via the message transmitter 252. On the other hand, when it is judged that retransmission is unnecessary, the retransmission requirement decider 260 discards the data or the like transmitted from the buffer in the controller 259 through the transmission slot. In this case, the data or the like may be moved to the information storage 230. The received message analyzer 220 or controller 259 of the node which has received the retransmitted message compares a slot number shared in the entire network with the slot number associated with the retransmission data, and can thereby judge whether or not the data included in the received message is the retransmission data.

Note that in the aforementioned example, the slot number together with the retransmission data is included in the message to be retransmitted, but this is not essential. Retransmission may be indicated, for example, by providing a retransmission flag field in the message and setting a retransmission flag in the field. Alternatively, a field for indicating a retransmission count may be provided and the retransmission count may be set in the field.

Each node may transmit the retransmission data and the slot number together with sensor data of the own node in the same message. This makes it possible to attain retransmission while maintaining a power saving property.

A network such as LLNs requiring a power saving property at each node attains power saving by limiting transmission opportunities of the node, and therefore increasing transmission opportunities for retransmission is not appropriate. On the other hand, there are a variety of types of retransmission such as retransmission in a data link layer such as a MAC (Media Access Control) layer, retransmission in a transport layer such as TCP, retransmission in an application layer. It is a common understanding that retransmission in a data link layer is not carried out in the case of a multicast-based or broadcast-based communication scheme. As the background of this, one of the enumerated reasons for this is that it is not possible to transmit ACK information or NACK information to each node under the multicast-based or broadcast-based communication scheme. In contrast, in the present embodiment and the embodiments described so far, since ACK information or NACK information can be simultaneously notified to a plurality of nodes in the form of a Bloom filter, retransmission in the data link layer is also possible. However, to attain retransmission in the data link layer, a slot needs to be newly provided. For this reason, it can be said that retransmission in a transport layer and an application layer is more suitable in terms of efficient use of wireless resources (slot or the like).

By limiting the retransmission count, tightness of a transmission band due to retransmission of data may be avoided. For example, the node on the receiving side compares the slot number of retransmission data with the slot number managed in each node and the entire network. When the difference between both slot numbers is equal to or higher than a threshold, the retransmission data is discarded. In this way, transfer of retransmission data to an upper node which is a node having a lower rank than the own node is stopped and it is thereby possible to avoid tightness of the transmission band by the retransmission data.

The transmission message generator 210 or the payload generator 214 stores data received from other nodes and transferred (transmitted) in association with information for identifying the data in the information storage 230. The transmission message generator 210 or the payload generator 214 checks whether or not the data received from a child node has already been transferred (transmitted) based on the information already stored in the information storage 230. When the received data is data already transmitted, that is, when the data is stored in the information storage 230, the data may not be transmitted. This makes it possible to prevent relaying of unnecessary data and avoid tightness of the transmission band.

Suppose, for example, that a child node transmits a message including sensor data of the own node and a parent node normally receives the message. However, when the child node has not successfully received the ACK information (ACK Bloom filter including the ID of the own node)

from the parent node, the child node retransmits the sensor data. In this case, when the parent node relays the retransmitted data again, unnecessary data is transmitted to the upper node. Thus, the parent node judges whether or not the data has already been transmitted and does not transfer the data to an upper node, when the data has already been transmitted, to thereby avoid tightness of the transmission band.

Figure 26:
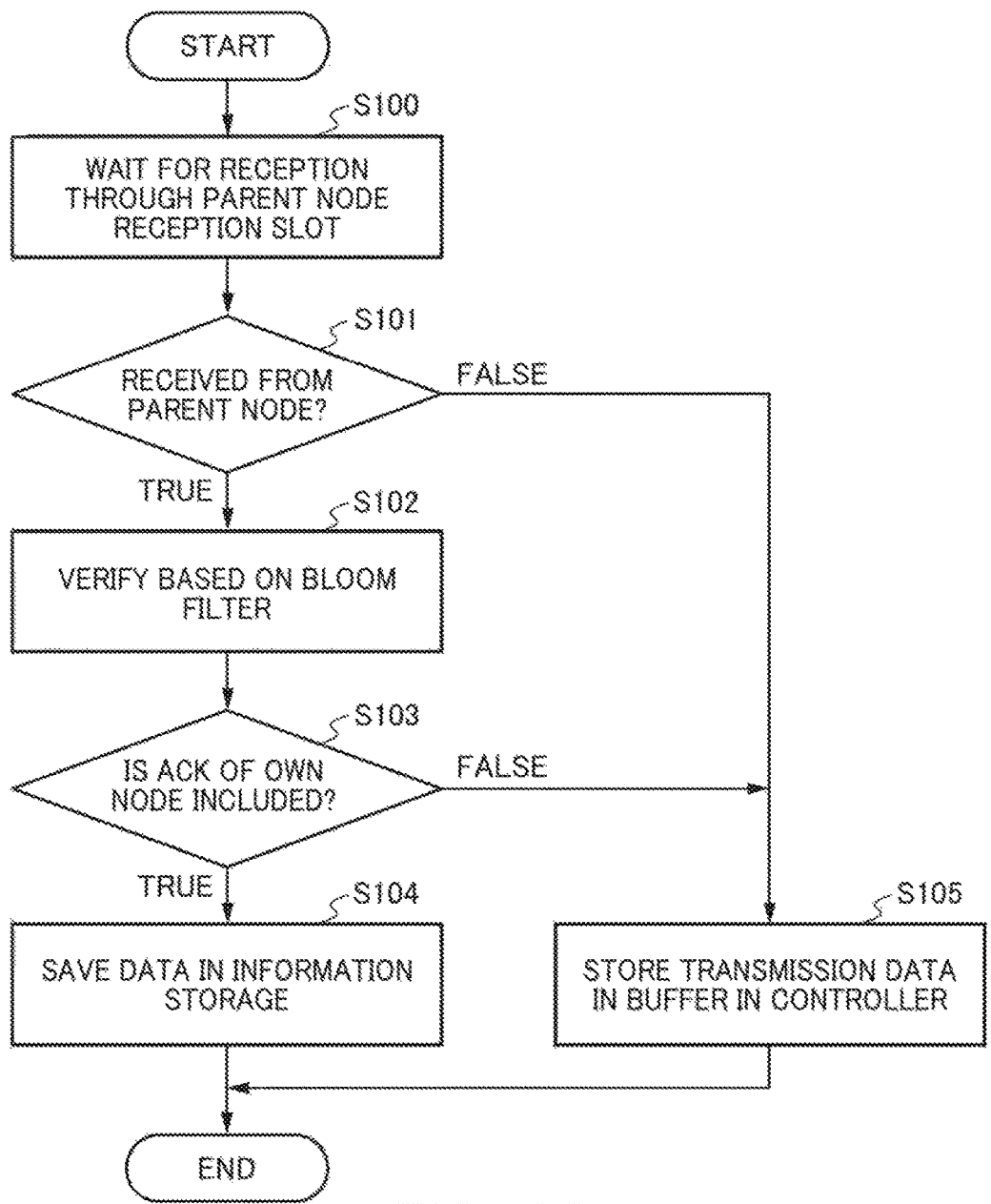
FIG. 26 is a flowchart illustrating part of processing of a child node according to the sixth embodiment.

FIG. 26 is a flowchart of operation carried out by the child node according to the present embodiment after transmitting a message to the parent node. Here, a case will be described where an ACK Bloom filter is included in the message. A similar operation is also possible in the case of a NACK Bloom filter.

After transmitting the message to the parent, node, the child node waits to receive the message from the parent node through a reception slot (step S100). Upon receiving the message, the child node judges whether or not the message is from the parent node (step S101).

When the received message is a message transmitted from the parent node (TRUE in step S101), the child node verifies through the bitmap verifier 224 whether or not ACK information is transmitted to the own node based on the ACK Bloom filter (step S102). As an example, when an argument of hash function is an ID of the node, if the ID of the own node is included in the ACK Bloom filter, the child node judges that ACK information is transmitted to the own node (step S102).

When ACK information is transmitted to the own node (TRUE in step S103), the child node saves the data as the target of ACK information (data or retransmission data transmitted first) in association with a slot number or the like in the information storage 230 (step S104).

On the other hand, when the received message is not the message transmitted from the parent node or when the message is not received through the reception slot (FALSE in step S101), or when no ACK information is transmitted to the own node (FALSE in step S103), the child node stores the transmission data for which no ACK information is returned in association with the slot number or the like in the buffer in the retransmission requirement decider 260 (step S105). The data or the like stored in the buffer is used for retransmission. Note that in the stage prior to step S100, the data and slot number or the like transmitted from the child node to the parent node may be temporarily stored in the buffer of the transmission message generator 210, the buffer of the controller 259 or in the information storage 230 or the like and moved to the buffer in the retransmission requirement decider 260 when executing step S105.

Figure 27:
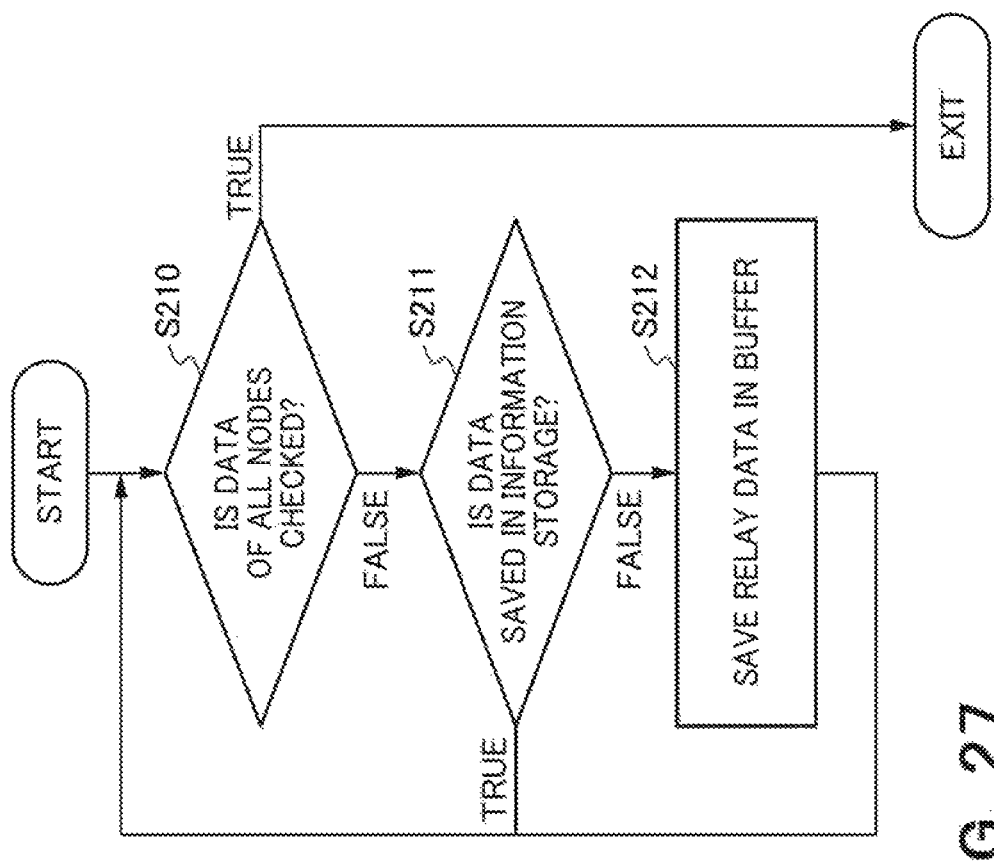
FIG. 27 is a flowchart illustrating part of processing of a parent node according to the sixth embodiment.
Figure 27:
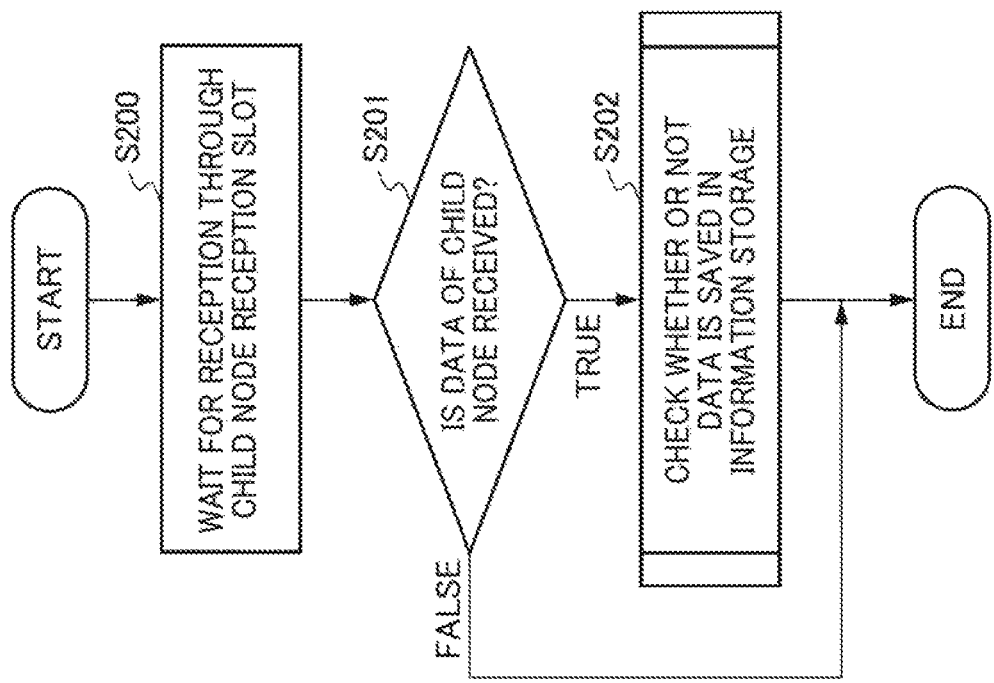

FIG. 27(A) is a flowchart of operation of a parent node according to the present embodiment.

The parent node waits to receive a message from the child node at a reception slot from the child node (step S200).

Upon receiving the message from the child node at the reception slot (TRUE in step S201), the parent node checks whether or not the same data (payload) as that included in the payload field of the message is saved in the information storage 230 (step S202). In this case, when data of a plurality of nodes is included in the payload field, a check is made on each node. On the other hand, when the parent node has not received the message from the child node at the slot (FALSE in step S201), the parent node ends the processing of the present flow. In a situation in which the parent node waits to receive the message from the child node, the parent node waits for reception again (S200).

FIG. 27(B) illustrates a flow of detailed operation in step S202 of FIG. 27(A). The parent node extracts data of each node from the payload field of the message received from the child node and judges whether or not processing has been executed on all the extracted data (S210). When the processing is executed on all the data (TRUE in step S210), the operation of this flow is ended. When some of the extracted data has not been processed yet, one item of, the data to be processed is specified and it is checked whether or not the same data as the specified data is saved in the information storage 230 (step S211). When the data is saved in the information storage 230 (TRUE in step S211), it is judged that the data need not be transmitted to an upper node (that is, the parent node of the own node). The flow returns to step S210. On the other hand, when the data is not saved in the information storage 230 (FALSE in step S211), the data is stored in the buffer or the like of the controller 259 to relay the data to the upper node and the flow returns to the process in step S210.

Thus, data which has never been transmitted to the upper node is saved in the buffer of the controller 259 as relay data. On the other hand, previously transmitted data is not saved in the buffer to thereby avoid transmission to the upper node. Note that when the parent node transmits the data to the upper node, the parent node becomes a child node of the upper node when seen from the upper node. In this case, the parent node operates as a child node according to the flow in FIG. 26.

As described above, according to the present embodiment, the child node analyzes whether or not ACK information or NACK information directed to the own node is included in the Bloom filter (ACK Bloom filter or NACK Bloom filter) transmitted from the parent node, and retransmits the data when that ACK information is not included or when NACK information is included. The child node can thereby reliably deliver the data to the parent node. During retransmission, by including the retransmission data in the same message as that of new data, more information can be transmitted efficiently. Furthermore, instead of the parent node always transmitting the data received from the child node to an upper node, the parent node does not transmit the data already transmitted (that is, data received from the child node through retransmission despite the fact that the data has already been transmitted to the upper node). This makes it possible to suppress tightness of the wireless band.

Other Embodiments

In all the aforementioned embodiments, communication is carried out using, for example, a radio wave but the communication medium is not limited to the radio wave. For example, light or sound wave as a radio wave in a broad sense can also be used as a medium. In that case, the configuration of the wireless communicator or the like may be modified according to the medium as appropriate.

In the aforementioned embodiments, a wireless sensor network has been described as an example, but other types of wireless networks can also be used which are constructed using a wireless communication technique such as NB-IoT (Narrow-Band Internet of Things), LoRaWAN which are classified as wireless LAN, Wi-Fi (registered trademark), Bluetooth (registered trademark), ZigBee (registered trademark), IEEE802.15.4, LPWAN (Low-Power Wide Area Network). Furthermore, instead of wireless networks, the network can be a wired network or a hybrid network of a wireless network and a wired network. Wired communication generally has higher certainty of transmission than wireless communication and has a smaller level of signal attenuation corresponding to a transmission distance than that of wireless communication, and therefore it is effective to use wired communication in combination within a wireless communication network in a case where it is difficult to secure reliability of transmission with wireless communication or a case where distances among nodes are too large. Since wired communication generally has a higher transmission success rate than wireless communication, wired communication may be used for the aforementioned fourth rank calculation method using "1" as an approximate value of the transmission success rate.

Furthermore, in a network such as a wireless sensor network, there can be a backup node configured to sniff a packet and record/store data in addition to the concentrator. Furthermore, data measured at each node may be fed back to a real world using an actuator or display device or both of them incorporated in the network. Furthermore, the measured data of respective nodes may be combined and used for analysis of human flow lines, disaster prediction, analysis of deterioration of infrastructure facilities such as bridges, roads, tunnels or weather forecast. Messages transmitted from wireless communication devices can include data other than sensor data, for example, information on malfunctions and soundness, link quality information with respect to adjacent nodes. It is also possible to transmit data from the concentrator or upper system to wireless communication devices, and also transmit optimum route information, time division slot allocation information, sensing cycle command or the like.

Furthermore, although a TDMA (Time Division Multiple Access) scheme has been used as a wireless communication scheme in the aforementioned embodiments, various schemes can also be used such as CSMA (Carrier Sense Multiple Access) scheme, CSMA/CA (Collision Avoidance) scheme, TSCH (Time Slotted Route Hopping) scheme and FTDMA (Frequency-Time Division Multiple Access) scheme.

Note that there may exist another system in the vicinity of a wireless communication device (node), which is different from the wireless communication device (node) of the embodiment of the present invention and a radio wave of the system may interfere with the wireless communication device (node) of the embodiment of the present invention. For this reason schemes like CSMA/CA (Collision Avoidance) may be used in combination among the individual slots. Furthermore, a protocol under a TDMA scheme may be adopted to attain realtimeness, and the embodiments of the present invention may also be applicable to such cases.

Furthermore, a scheme called "TSCH (Time Slotted Channel Hopping)" is also available as a scheme whereby TDMA is further developed. According to TSCH, respective nodes carry out communication while changing wireless channels used for transmission/reception. It is thereby possible to improve throughput of the entire network and minimize influences of radio wave interference from other peripheral wireless systems produced in some specific channels. Therefore, it is possible to make the system less susceptible to radio wave jamming or radio wave interception. TSCH allows a plurality of channels to be used through one time slot. For this reason, a plurality of transmission node/reception node pairs in parallel can implement communication. With TSCH or 6TiSCH (IPv6 over TSCH) which is a wireless communication standard using TSCH, a combination of one time slot and one frequency is called a "cell" or "link." When using a TSCH or 6TiSCH network, the time slot may be read as a "cell" or "link" as appropriate in the description of the aforementioned embodiments, and it is thereby possible to attain similar implementation. It goes without saying that the present invention is applicable to a wireless communication system compliant with TSCH or 6TiSCH or a wireless communication standard to which TSCH or 6TiSCH is applied.

One of the modes of the wireless network assumed in the aforementioned embodiments is LLNs which requires a power saving property for operation of nodes. In such a network, an operation time and a communication period of each node are suppressed to a minimum level, and a relatively long sleep time may be secured for the processor, circuit and wireless module. The wireless communication device according to the present embodiment may also have control so as to provide sleep timing in this way. Any algorithm may be used to control the sleep.

Regarding wireless network modes, many systems use frequency hopping to increase communication bands, and frequency hopping can be used also in the aforementioned embodiments. In the network adopting the sleep, both the transmission nodes and the reception nodes need to release the sleep. When frequency hopping is adopted, communication can be performed correctly when the transmission nodes and the reception nodes are operating on the same wireless channel.

The operations in the aforementioned embodiments may be directly carried out using hardware or devices such as FPGA (Field Programmable Gate Array) or ASIC (Application Specific Integrated Circuit). Alternatively, information processing may be executed by causing a computer provided with the wireless communication device 110 which is hardware to execute software (program).

The above-described communication modes can also be combined with encrypted communication. For example, by encrypting fields other than the Bloom filter field (bitmap field), communication is carried out by hiding payloads and other important data. As another example, a shared key is shared among nodes in a network in addition to destination node IDs and it, is thereby possible to perform encrypted communication under a shared key scheme.

Note that a Bloom filter is used as a bitmap in the aforementioned embodiments, but other algorithms may also be used if such algorithms project given data onto a bitmap of a predetermined length based on a definitive projection relationship. For example, it is possible to adopt an algorithm that projects data without using the entire bitmap, projects only lower X bits of the bitmap based on a definitive projection relationship. Alternatively, a counting filter which is an expanded Bloom filter may be used.

The counting filter is provided with a plurality of counters each being composed of a region of several bits. In the Bloom filter, one bit is associated with each hash value, while in the counting filter, individual hash values are associated with their respective counters. FIG. 28 shows a configuration example of the counting filter. The counting filter includes 64 counters, the leftmost longitudinal column is a 0th counter, and the rightmost longitudinal column is a 63rd counter. One counter is provided with four bits.

When an element is added, for example, an ID is added to an ACK counting filter, a counter corresponding to a hash value sequence of the node ID is incremented. For example, the 0th counter in FIG. 28 is "0111" but "1" is added to the value after the increment and the value becomes "1110." That is, the 0th bit is set to "0" (second value), and the first, second and third bits are set to "1" (first value). On the other hand, when an element is deleted, the counter corresponding to the hash value sequence of the node ID is decremented.

For example, the 0th counter is "0111," whereas "1" is subtracted from the value after the decrement, and the value becomes "0110."

By adopting such a mounting, it is possible to suppress "false positive" of the Bloom filter and also delete the element. Furthermore, even when collision of hash values occur, it is possible to know the number of collision times by checking the counter value.

Note that such increment and decrement processes may be performed by the bitmap generator 212 or the bitmap verifier 224, or a dedicated processor may also be provided. In the counting filter, the counter needs to have a sufficiently large capacity to prevent overflow from occurring, but if overflow occurs, it is possible to prevent the value of the counter itself from changing when adding or deleting the element.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

The term "storage" may encompass any device which can permanently memorize data by magnetic technology, optical technology or non-volatile memory. For example, the storage may be an HDD, an optical disc, an SDD or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device comprising:
processing circuitry configured to calculate a function having as an argument each of identifiers of other first communication devices and set bits corresponding to values of the function to first values to generate first data; and a communicator configured to transmit a first message including the first data to the other first communication devices, wherein the communicator waits to receive second messages from the other first communication devices until a predetermined timing, and the processing circuitry specifies second messages which have been received until the predetermined timing and generates the first data by using the function and identifiers of other first communication devices from which the specified second messages have been received, wherein the first data is acknowledgment information indicating the specified second message have successfully been received, or the communicator waits to receive second messages from the other first communication devices until a predetermined timing and the processing circuitry specifies second messages which have not been received until the predetermined timing, and generates the first data by using the function and identifiers of communication devices from which the second messages have not been received, wherein the first data is non-acknowledgment information indicating the specified second messages have not successfully been received.

2. The communication device according to claim 1, further comprising a hardware storage configured to store information on other first communication devices communicable with the communicator.

3. The communication device according to claim 1, wherein the processing circuitry is configured to calculate the function on having as the argument an identifier of the own communication device and each of the identifiers of the other first communication devices, and generate bits corresponding to values of the function to first values to generate second data, and
the communicator is configured to transmit the first message including the second data.

4. The communication device according to claim 1, wherein the processing circuitry is configured to calculate the function having as the argument the identifier of each other first communication device and having as a second argument a value to be notified by the communicator to each other first communication device.

5. The communication device according to claim 1, wherein the communicator is configured to receive a fourth message including a third data, and
the processing circuitry is configured to calculate the function having as the argument an identifier of the own communication device and verify a bit corresponding to a value of the function in the third data.

6. The communication device according to claim 5, wherein the communicator is configured to transmit the fourth message including retransmission data to a communication device which is a sender of the fourth message when a verification result shows that at least one of the bit corresponding to the value of the function in the third data is a second value.

7. The communication device according to claim 5, wherein the communicator is configured to transmit the fourth message including retransmission data to a communication device which is a sender of the fourth message when a verification result shows that all of the bit corresponding to the value of the function in the third data are a first value.

8. A wireless communication system comprising:
the wireless communication device according to claim 5.

9. A wireless communication system comprising:
the wireless communication device according to claim 1.

10. The communication device according to claim 1, wherein the first data is a bloom filter.

11. A non-transitory computer readable medium having a computer program stored therein which when executed by a computer, causes the computer to perform processing comprising:
   calculating a function having as an argwnent each of identifiers of other first communication devices;
   setting bits corresponding to values of the function to first values to generate first data; and
   transmitting a first message including the first data to the other first communication devices,
   wherein
   further comprising waiting to receive second messages from the other first communication devices until a predetermined timing, specifying second messages which have been received until the predetermined timing, generating the first data by using the function and identifiers of other first communication devices from which the specified second messages have been received, wherein the first data is acknowledgment information indicating the specified second message have successfully been received, or further comprising waiting to receive second messages from the other first communication devices until a predetermined timing, specifying second messages which have not been received until the predetermined timing generating, the first data by using the function and identifiers of communication devices from which the second messages have not been received, wherein the first data is non-acknowledgment information indicating the specified second message have not successfully been received.

* * * * *